(12) United States Patent
Tsukamoto et al.

(10) Patent No.: US 12,533,525 B2
(45) Date of Patent: Jan. 27, 2026

(54) LIGHT IRRADIATION DEVICE AND LIGHT IRRADIATION SYSTEM

(71) Applicant: ILLUMI MEDICAL INC., Owariasahi (JP)

(72) Inventors: Toshihiko Tsukamoto, Owariasahi (JP); Kazuhide Sato, Owariasahi (JP)

(73) Assignee: ILLUMI MEDICAL INC.

(*) Notice: Subject to any disclaimer, the term of this patent is extended or adjusted under 35 U.S.C. 154(b) by 0 days.

(21) Appl. No.: 18/966,103

(22) Filed: Dec. 2, 2024

(65) Prior Publication Data

US 2025/0090860 A1    Mar. 20, 2025

Related U.S. Application Data

(63) Continuation of application No. PCT/JP2023/028641, filed on Aug. 4, 2023.

(30) Foreign Application Priority Data

Mar. 3, 2023 (WO) .................. PCT/JP2023/008007

(51) Int. Cl.
*A61N 5/06* (2006.01)
*A61N 5/067* (2006.01)

(52) U.S. Cl.
CPC ........... *A61N 5/062* (2013.01); *A61N 5/0603* (2013.01); *A61N 5/067* (2021.08); *A61N 2005/0602* (2013.01); *A61N 2005/063* (2013.01); *A61N 2005/0643* (2013.01)

(58) Field of Classification Search
CPC ............ A61N 5/062; A61N 5/067; A61N 2005/0602; A61N 5/0603; A61N 2005/0626; A61N 2005/0628; A61N 2005/063; A61N 2005/0643; A61N 2005/065
USPC .................................................. 607/88, 89
See application file for complete search history.

(56) References Cited

U.S. PATENT DOCUMENTS

| | | | | |
|---|---|---|---|---|
| 5,242,438 | A * | 9/1993 | Saadatmanesh | A61B 18/24 606/7 |
| 5,415,654 | A * | 5/1995 | Daikuzono | A61N 5/0601 606/7 |
| 5,776,174 | A * | 7/1998 | Van Tassel | A61N 5/0601 606/15 |
| 6,221,068 | B1 * | 4/2001 | Fried | A61B 18/20 606/14 |
| 7,108,692 | B2 * | 9/2006 | Frenz | A61B 18/24 606/7 |

(Continued)

FOREIGN PATENT DOCUMENTS

| | | |
|---|---|---|
| JP | H0392144 A | 4/1991 |
| JP | 2003508124 A | 3/2003 |

(Continued)

*Primary Examiner* — Ahmed M Farah
(74) *Attorney, Agent, or Firm* — Best Mode IP Law, PLLC; Yusuke Hirai

(57) ABSTRACT

A light irradiation has an elongated shape. The light irradiation device includes laser light sources that emit laser light in a predetermined wave range. The laser light sources emit laser light in a direction intersecting a longitudinal axial direction of the light irradiation device. The laser light sources of the light irradiation device locally transmit the laser light to a particular location of a living body.

20 Claims, 11 Drawing Sheets

(56) References Cited

U.S. PATENT DOCUMENTS

| | | | |
|---|---|---|---|
| 7,985,219 B2* | 7/2011 | Wilkens | A61N 5/0616 |
| | | | 606/9 |
| 8,291,915 B2* | 10/2012 | Farley | A61B 18/1492 |
| | | | 606/7 |
| 9,693,826 B2* | 7/2017 | Neuberger | A61B 18/24 |
| 9,788,897 B2* | 10/2017 | Neuberger | A61B 17/22004 |
| 11,874,455 B2* | 1/2024 | Katsurada | A61B 18/18 |
| 12,357,842 B2* | 7/2025 | Tsukamoto | A61N 5/0603 |
| 2005/0187541 A1* | 8/2005 | Maschke | A61B 18/24 |
| | | | 606/15 |
| 2006/0282132 A1* | 12/2006 | Arai | A61N 5/062 |
| | | | 607/88 |
| 2009/0222069 A1* | 9/2009 | Petersen | A61N 5/0616 |
| | | | 604/20 |
| 2014/0088575 A1* | 3/2014 | Loeb | A61B 18/24 |
| | | | 606/7 |
| 2018/0333205 A1 | 11/2018 | Paamand et al. | |
| 2022/0047884 A1* | 2/2022 | Katsurada | A61N 5/0601 |
| 2022/0047885 A1* | 2/2022 | Tsukamoto | A61B 90/39 |
| 2022/0229282 A1* | 7/2022 | Katsurada | A61B 18/18 |

FOREIGN PATENT DOCUMENTS

| | | | | |
|---|---|---|---|---|
| JP | 2006271831 A | 10/2006 | | |
| JP | 2007528752 A | 10/2007 | | |
| JP | 2010506624 A | 3/2010 | | |
| JP | 2011525827 A | 9/2011 | | |
| JP | 2014523907 A | 9/2014 | | |
| JP | 2016520623 A | 7/2016 | | |
| JP | 2018000867 A | 1/2018 | | |
| JP | 2020138940 A | 9/2020 | | |
| JP | 2020185257 A | 11/2020 | | |
| WO | WO 01/015694 A1 | 3/2001 | | |
| WO | WO2004112902 A1 | 12/2004 | | |
| WO | WO-2009108956 A1 * | 9/2009 | | A61B 18/24 |
| WO | WO2011111645 A1 | 9/2011 | | |
| WO | WO2020071023 A1 | 4/2020 | | |

* cited by examiner

FIG. 12

| LIGHT SOURCE SETTINGS (DIAL) | OUTPUT VALUE OF BLANK STATE | IRRADIATION DENSITY | DETECTION RESULTS OF CAROTID ARTERY ARRANGEMENT STATE | DETECTION RESULTS OF AORTA ARRANGEMENT STATE |
|---|---|---|---|---|
| 3-0 | 2.0mW (0.002W) | 1.6W/cm² | Not Detected | Not Detected |
| 3-20 | 15.0mW (0.015W) | 11.9W/cm² | 1.1mW | Not Detected |
| 3-50 | 52.0mW (0.052W) | 41.4W/cm² | Not Tested | 2.0mW |
| 3-90 | 99.0mW (0.099W) | 78.8W/cm² | 21.1mW | 7.9mW |
| 10-0 | 734.0mW (0.734W) | 584.4W/cm² | 176.7mW | 86.4mW | ial Patent Application No. PCT/JP2023/008007 filed on Mar. 3, 2023. The entire disclosure of the above application is incorporated herein by reference.

LIGHT IRRADIATION DEVICE AND LIGHT IRRADIATION SYSTEM

CROSS REFERENCE TO RELATED APPLICATION

This application is a continuation application of International Patent Application No. PCT/JP2023/028641 filed on Aug. 4, 2023, which designated the U.S. and claims the benefit of priority from International Patent Application No. PCT/JP2023/008007 filed on Mar. 3, 2023. The entire disclosure of the above application is incorporated herein by reference.

TECHNICAL FIELD

The present disclosure relates to a light irradiation device and a light irradiation system used inside a biological lumen to emit light.

BACKGROUND

PDT (Photodynamic Therapy) is known as one technique for treating diseases. In PDT, after a light-sensitive substance is administered into a living body, the living body is irradiated with light. As a result, cancer cells may be killed due to active oxygen generated in the cancer cells. However, in PDT, it is difficult to selectively the light-sensitive substance only into cancer cells. Occurrence of side effects due to the photosensitive substance absorbed into normal cells is an issue with PDT.

In response to the issue, NIR-PIT (Near-Infrared Photoimmunotherapy) has been proposed in recent years. In NIR-PIT, a complex combining two compounds, an antibody against an antigen specific to cancer cells and a light-sensitive substance, is used. When administered into a living body, the complex is easily selectively accumulated only into cancer cells in the living body. Thereafter, the complex is activated by irradiating the living body with light of the excitation wavelength (e.g., wavelength including 690 nm, etc.) for the light-sensitive substance in the complex. In NIR-PIT, if the complex is selectively accumulated in cancer cells by antibodies and the cancer cells are locally irradiated with light, side effects are less likely to occur as compared to PDT.

The wavelength range including 690 nm is also called as a "spectroscopic window" of living bodies. The light within the range is less absorbed into the living body as compared to another wavelength range. On the other hand, light in the wavelength range including 690 nm is difficult to penetrate into a living body when the living body is irradiated from the body surface. Thus, it is difficult to treat a cancer existing deeply inside a living body by irradiation the living body with light from the body surface.

In view of this, instead of irradiating a living body with light from the body surface, a technology for irradiating a living body with light at a position closer to cancer cells has been proposed. For example, a device is inserted into a blood vessel to emit light at a position deeply inside the body. In another device, a marker having radiation opacity is disposed near the light irradiation portion so as to easily make positioning of the light irradiation site as compared to the device without the marker. Also, in yet another device, a plurality of light emitting diodes are provided in a hollow shaft.

SUMMARY

A light irradiation device for medical use in a typical embodiment of the present disclosure has an elongated shape. The light irradiation device includes a laser light source that is disposed in a tip portion of the light irradiation device, the laser light source being configured to emit laser light in a predetermined wavelength range. After the light irradiation device was inserted into a blood vessel in a living body, the laser light source is configured to emit the laser light in a direction intersecting a longitudinal axial direction of the light irradiation device to irradiate a living tissue outside of the blood vessel with the laser light passing through a blood vessel wall. The laser light source is further configured to emit the laser light having a light irradiation density of 80 W/cm$^2$ or more and 1,600 W/cm$^2$ or less at a time of the laser light exiting the light irradiation device.

A light irradiation system for medical use in a typical embodiment of the present disclosure includes: a catheter that is formed in an elongated tube shape; and a light irradiation device that has an elongated shape and is inserted into a lumen of the catheter. The light irradiation device includes a laser light source in a tip portion of the light irradiation device. The laser light source is configured to emit laser light in a predetermined wavelength range. After the light irradiation device was inserted into a blood vessel in a living body, the laser light source is further configured to emit laser light in a direction intersecting a longitudinal axial direction of the light irradiation device to irradiate a living tissue outside of the blood vessel with the laser light passing through a blood vessel wall. The laser light source is further configured to emit the laser light having a light irradiation density of 80 W/cm$^2$ or more and 1,600 W/cm$^2$ or less at a time of the laser light exiting the light irradiation device. A light transmission portion is formed in at least a portion of a side surface of a tip end of the catheter. The light transmission portion is configured to transmit the laser light emitted from the laser light source to exit the catheter.

BRIEF DESCRIPTION OF DRAWING

FIG. 12 is a diagram showing results of a first evaluation test.

DESCRIPTION OF EMBODIMENTS

Figure 1:
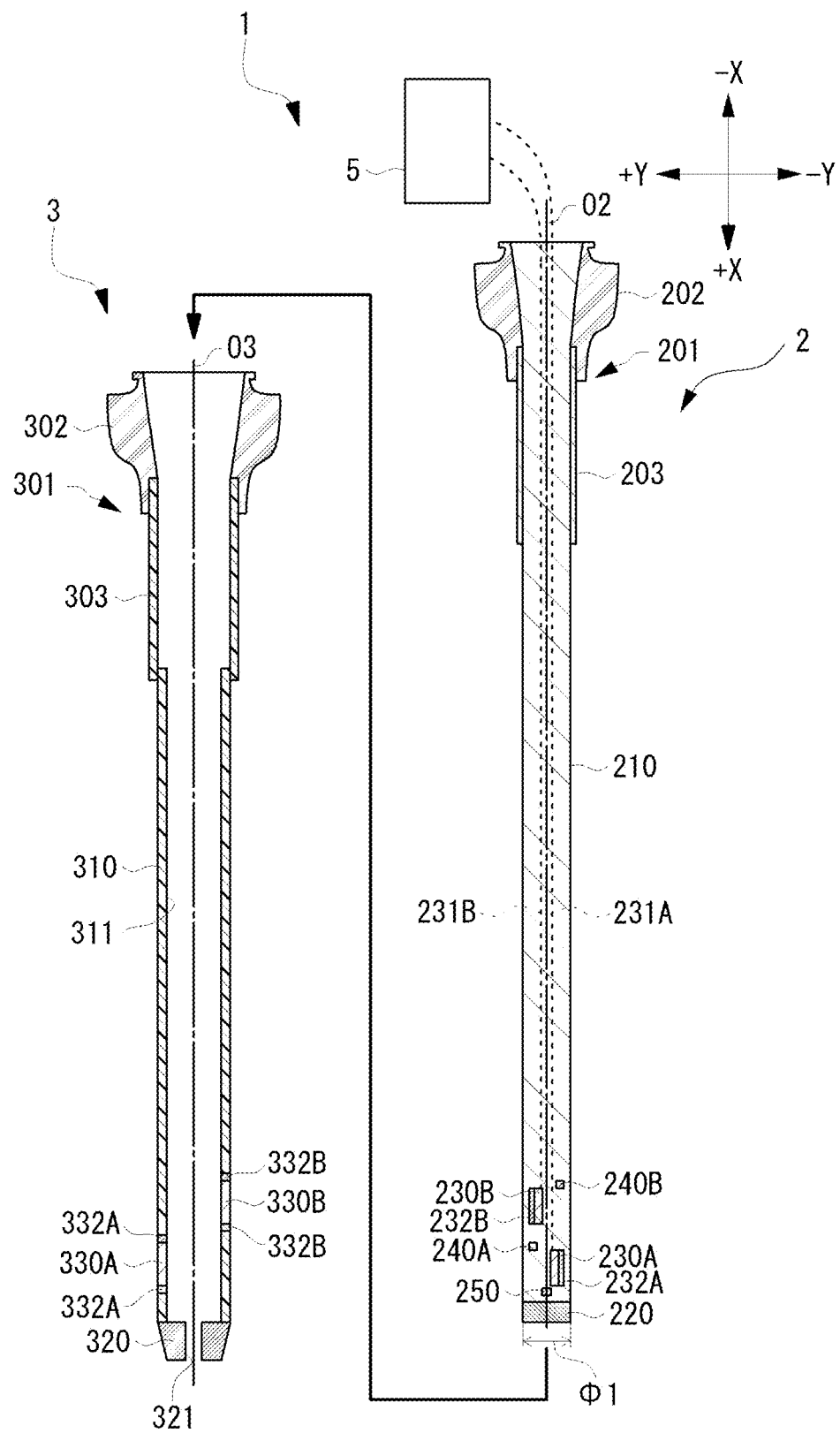
FIG. 1 is a longitudinal cross-sectional view of a light irradiation system 1 where a light irradiation device 2 and a catheter 3 are separated from each other.

Next, a relevant technology will be described first only for understanding the following embodiments. In the above-described device having the marker, it is necessary to transmit light emitted by an externally provided light source to the tip end of the device using an optical transmission member (for example, an optical fiber, etc.). When such an optical transmission member is used, bending, etc., may occur in the optical transmission member within a lumen of a living body. As a result, a light leakage or attenuation may occur before the light reaches the tip end of the device. When the light leaks or attenuates, problems such as a decrease in light transmission efficiency or a decrease in safety may occur. Also, in the process of transmission of the light by the optical transmission member, characteristics of the light (for example, wavelength, etc.) may change, making it difficult to obtain intended therapeutic effects. Furthermore, connecting multiple optical transmission members may be required. On the other hand, a light transmission member is not used in the above-described device having the plurality of light emitting diodes. However, since the light emitted from the plurality of light emitting diodes spreads in multiple directions, it is extremely difficult to selectively emit the light to a target position. Accordingly, a technology capable of emitting light more efficiently and appropriately to a specific position in a lumen of a living body has been desired.

A typical objective of the present disclosure is to provide a light irradiation device and a light irradiation system capable of emitting light more efficiently and appropriately to a particular position in a lumen of a living body.

A light irradiation device for medical use in a typical embodiment of the present disclosure has an elongated shape. The light irradiation device includes a laser light source that is disposed in a tip portion of the light irradiation device, the laser light source being configured to emit laser light in a predetermined wavelength range. The laser light source is configured to emit the laser light in a direction intersecting a longitudinal axial direction of the irradiation device.

A light irradiation system for medical use in a typical embodiment of the present disclosure includes: a catheter that is formed in an elongated tube shape; and a light irradiation device that has an elongated shape and is inserted into a lumen of the catheter. The light irradiation device includes a laser light source in a tip portion of the light irradiation device. The laser light source is configured to emit laser light in a predetermined wavelength range. The laser light source is further configured to emit laser light in a direction intersecting a longitudinal axial direction of the light irradiation device. A light transmission portion is formed in at least a portion of a side surface of a tip end of the catheter. The light transmission portion is configured to transmit the laser light emitted from the laser light source to exit the catheter.

According to the light irradiation device and the light irradiation system in the present disclosure, light can be emitted more efficiently and appropriately to a particular position in a lumen of a living body.

A light irradiation device for medical use in the present disclosure is a light irradiation device having an elongated shape. The light irradiation device includes a laser light source that is disposed in a tip portion of the light irradiation device. The laser light source is configured to emit laser light in a predetermined wavelength range. The laser light source is configured to emit the laser light in a direction intersecting a longitudinal axial direction of the irradiation device.

Accordingly, the light irradiation device in the present disclosure can directly emit light from the laser light source provided at the tip portion to a particular position of the living body without passing through an optical transmission member (for example, an optical fiber, etc.). Thus, it is possible to suppress various problems that would occur when an optical transmission member is used (for example, a problem where a light leaks in the optical transmission member or a problem where the characteristics of light change during the process of transmission of the light, etc.). Also, the laser light source emits laser light from the tip portion of the light irradiation device in a direction intersecting the longitudinal axial direction. Compared to a light emitting diode, the laser light source may easily emit light that has high directivity and is less likely to diverge. Accordingly, the light irradiation device in the present embodiment may locally irradiate a specific location of a living body with laser light emitted from the laser light source. As a result, various problems (for example, occurrence of side effects, etc.) due to light being emitted to an unintended location are also less likely to occur. Furthermore, the laser light source has characteristics to emit light with a narrower spectral range as compared to a light emitting diode. Thus, by providing the laser light sources in the tip portion of the light irradiation device, occurrence of various problems (for example, reduction in irradiation efficiency, unintended tissue degeneration, etc.) due to irradiation of a tissue with a light having a wavelength different from the wavelength necessary for treatment (for example, the excitation wavelength of a light-sensitive substance, etc.) can be also suppressed. Thus, a particular location in the living body can be irradiated more efficiently and appropriately with the light.

Note that the "tip portion" of the light irradiation device does not mean only the exact tip of the light irradiation device. In other words, "disposed in the tip portion" in the present disclosure may include a situation where the light irradiation portion is provided at a location shifted to a base side from the exact tip to the extent that laser light can be locally emitted to a specific site.

The light irradiation device may include a plurality of laser light sources in the tip portion. Since the multiple laser light sources are disposed in a single light irradiation device, the degree of freedom of laser irradiation (for example, ease of adjusting at least one of a laser irradiating area, an irradiation density, an irradiation direction, etc.) can be improved as compared to a situation where only one laser light source is provided. As a result, an appropriate therapeutic effect can be obtained even more easily.

At least one of the plurality of laser light sources is separately controllable from other laser light sources of the plurality of laser light sources. In this case, the degree of freedom of laser irradiation is further improved. For example, by adjusting the number of laser light sources that emit laser light, it is also possible to change at least one of the laser irradiation area, irradiation density, irradiation direction, etc. Also, by switching the laser light sources to emit laser light, it is also possible to change a target site for irradiation with the laser light.

However, the plurality of laser light sources may be controlled collectively. Even in this case, since the number and arrangement of multiple laser light sources are appropriately designed, the degree of freedom of laser irradiation is appropriately improved.

Also, the plurality of laser light sources may emit laser light in the same wavelength range. In this case, laser light in the same wavelength range can be emitted to a specific area with a higher degree of freedom (for example, with a state where at least one of the laser irradiation area and irradiation density is appropriately adjusted). As a result, an appropriate therapeutic effect can be obtained even more easily.

At least one of the plurality of laser light sources may emit the laser light in a different wavelength range from other laser light sources of the plurality of laser light sources. In this case, laser light in different wavelength ranges can also be selectively or collectively emitted to a living tissue. Thus, the degree of freedom of treatment is further improved.

The laser light source is housed in a portion of a device body having an elongated shape. At least the portion of the device body may be made of a material that transmits the laser light emitted from the laser light source. By housing the laser light sources in the device body, the laser light sources can be held in the device body in a stable state as compared to a situation where the laser light sources are exposed to an outside from the device body. Furthermore, a problem such as a failure in the laser light sources is also less likely to occur. Furthermore, the laser light emitted from the laser light sources penetrates the device body, and can appropriately reach the living tissue. Thus, treatment can be performed more appropriately.

However, it is also possible to change the configuration of the device body. For example, a laser light transmission window without a physical member may be formed at a part of the device body through which laser light emitted from the laser light source passes. In this case, the material of the portion of the device body near the laser light source is not necessarily limited to a material that transmits laser light.

By performing a first evaluation test and a second evaluation test (both of which will be described later), the inventors of the present application have newly discovered a desirable range (i.e., an upper limit and a lower limit) of light irradiation density of laser light emitted from the laser light sources at a time of the laser light exiting the light irradiation device 2. The laser light source may emit the laser light having a light irradiation density of 80 $W/cm^2$ or more and 1,600 $W/cm^2$ or less at a time of the laser light exiting the light irradiation device. In this case, treatment effects by irradiating the light-sensitive substance with the laser light can easily be obtained appropriately.

Note that the light irradiation density at the time of emitting the laser light from the light irradiation device is more preferably 300 $W/cm^2$ or more and 1,300 $W/cm^2$ or less, and more preferably 600 $W/cm^2$ or more and 1,300 $W/cm^2$ or less. As an example, in the present disclosure, the light irradiation density at the time of the laser light exiting the light irradiation device is approximately 1,273 $W/cm^2$.

Also, the above conditions for the light irradiation density can be used regardless of the number of the laser light sources provided in the light irradiation device. For example, when laser light is simultaneously emitted from the multiple laser light sources and the laser light is combined with each other, the above-described conditions may be used as the conditions for the light irradiation density of the combined laser light.

The tip portion of the medical irradiation device in which the laser light source may include a marker having radiation opacity. In this case, a health care worker (for example, a doctor, etc.) can appropriately adjust the irradiating position of laser light by checking the positions of the marker shown in the image when irradiating a living tissue with the laser light while imaging the inside of the living body using radiation (for example, X-rays, etc.). Thus, the accuracy of treatment can be further improved and made easier.

At least a portion of the laser light source may be made of a material having radiation opacity such that the laser light source serves as the marker. In this case, although a marker is not separately provided from the laser light source, the position of the laser light source can be appropriately recognized through radiographic imaging. Furthermore, since the laser light source itself serves as a marker, the position of the laser light source is more accurately recognized by a health care worker. Thus, treatment can be performed more appropriately.

However, it is also possible to change the configuration of the marker. For example, a marker may be provided separately from the laser light source. For example, a tip end may be provided in the tip portion of the light irradiation member. At least a portion of the tie end may be made of a material having radiation opacity such that the tip end serves as the marker. In this case, since the tip end also serves as a marker, adjustment of the laser light irradiation position can be appropriately performed without an increase in the number of members. Also, a marker may be provided separately from the laser light source and the tip end. When a plurality of laser light sources are used in a single light irradiation device, a marker may be disposed in each laser light source. In this case, the positions of the plurality of laser light sources can be easily recognized.

The laser light source may be a surface-emitting laser that has a substrate and is configured to emit laser light in a direction perpendicular to the substrate. By using the surface-emitting laser, laser light is appropriately emitted with a small power, and the light irradiation device is also highly resistant to temperature changes. Furthermore, since the surface-emitting laser can emit laser light in a direction perpendicular to the substrate surface, it is easier to adjust the irradiation position of the laser light more accurately.

The laser light source may be a semiconductor laser that is a circuit element manufactured using a semiconductor as a material. Since such a semiconductor laser is easily miniaturized, the semiconductor laser can be appropriately incorporated into the light irradiation device having a small diameter. Also, the semiconductor laser can emit highly directional laser light with a consistent phase with a small amount of power. Thus, the therapeutic effects can be also stabilized.

The light irradiation device further includes a light detection transmission member that is configured to transmit light having entered the tip portion to an optical sensor, or an optical sensor that is disposed at the tip portion. In this case, the state of light entering the tip portion of the light irradiation portion can be appropriately detected by an optical sensor. When a light detection transmission member that transmits light having entered the tip portion to the optical sensor is provided, the state of the light in the tip portion can be appropriately detected without making the configuration of the tip portion of the light irradiation device complicated. Also, when a optical sensor is provided in the tip portion, the state of the light in the tip portion is directly detected by the optical sensor in the tip portion. In other words, changes in the characteristics of the light that may occur during the transmission process are unlikely to occur in light detected by the optical sensor. Thus, the state of the light can be detected more accurately and easily.

Note that other sensors may be provided in the tip portion of the light irradiation device separately from or together with the optical sensor. For example, a temperature sensor may be disposed in the tip portion of the light irradiation device. In this case, the temperature at the tip portion of the light irradiation device is appropriately detected. Thus, for example, at least one of a temperature increase due to heat from the laser light source provided in the tip portion and a temperature increase due to the laser light being emitted to a living tissue can be appropriately detected. Further, the light irradiation device further includes a light detection transmission member that is configured to transmit light having entered the tip portion to a spectroscopic sensor, or a spectroscopic sensor that is disposed at the tip portion. The spectroscopic sensor detects light generated by a substance in response to absorbing the light emitted from the laser light source. By confirming detection results by the spectroscopic sensor, it is possible to confirm whether the laser light is appropriately emitted to the target area (for example, an affected site, etc., where the light-sensitive substance is absorbed and accumulated). Furthermore, it is also possible to confirm the progress of treatment by monitoring changes over time in the intensity of the light generated by the substance in response to absorbing the light. Also, the light irradiation device may have a pressure sensor in the tip portion. When a light-sensitive substance to which laser light is emitted reacts, cell contents are scattered to the surroundings. By confirming the detection results by the pressure sensor, it is possible to confirm whether the light-sensitive substance has responded appropriately. Also, the light irradiation device may have a pH sensor in the tip portion. In this case, pH near the tip portion of the light irradiation device can be appropriately detected by confirming the detection results by the pH sensor. Also, the light irradiation device may have a flow rate sensor in the tip portion. By confirming the detection results by the flow rate sensor, it is possible to confirm whether the light-sensitive substance has responded appropriately. As described above, when the light irradiation device includes various sensor systems, it is possible to provide various information useful for treatment.

The light irradiation device may include a plurality of temperature sensors. The temperature measurement positions of the plurality of temperature sensors may be arranged in the plurality of portions in the tip portion of the light irradiation device. In this case, useful information can be acquired based on temperature detection results at each of the plurality of measurement positions. For example, it is also possible to confirm the direction in which the laser light is emitted by confirming which of the plurality of measurement positions has a higher temperature than other measurement positions. Also, a health care worker can improve treatment accuracy by more accurately grasping the temperature at each measurement position.

The light irradiation device may further include a wire extending from a base side to the tip portion. At least one of the wires may be arranged spirally in the main body of the light irradiation device. Since the wire is arranged in a spiral shape, the rigidity of the elongated light irradiation device can be appropriately secured as compared to a situation where the wire is arranged to linearly extend along the axial direction. Thus, the accuracy of treatment can be further improved.

Note that the wire arranged in a spiral shape can be appropriately selected. For example, a wire for the temperature sensor (for example, thermocouples, etc.) may be arranged in a spiral shape. Also, when measurement positions (measurement points) of a plurality of temperature sensors are set in the tip portion of the light irradiation device, the measurement positions of the temperature sensors may be respectively arranged at the multiple positions of the spirally arranged wire. In this case, the measurement positions of the plurality of temperature sensors can be easily and appropriately arranged in the axial direction and the circumferential direction of the elongated light irradiation device. Also, a wire of the laser light source may be arranged in a spiral shape.

Also, at least one of the wires may include a material having radiation opacity. In this case, the position of the elongated light irradiation device can be appropriately recognized by radiographic imaging. Note, when a wire having irradiation opacity is arranged in a spiral shape, the position of the light irradiation device can be recognized.

The light irradiation device may further include a position detection member that detects the position of the tip portion in a lumen of a living body. In this case, since the position of the position detection member provided in the light irradiation device is detected, the position of the tip portion of the light irradiation device in a lumen of a living body can be easily recognized. Note that various members (for example, at least one of a small ultrasonic oscillator or a magnet, etc.) for detecting the position in the lumen can be used as the position detection member.

The irradiation device further includes a magnetic member that is configured to guide a position or an orientation of the tip portion in a living body using a magnetic force generated by the magnetic member placed in a magnetic field. In this case, while the light irradiation device is inserted into a living body, at least one of the position and direction of the tip portion of the light irradiation device is appropriately guided. Thus, treatment can be performed more appropriately.

The specific configuration of the magnetic member can be selected as appropriate. For example, a magnetic member may be provided in a portion of the laser light source opposite to a portion that emits laser light. In this case, the orientation of each of the magnetic members respectively disposed in the laser light sources (that is, the circumferential direction about the axis of the light irradiation device) is adjusted by magnetic force, making it easier to properly control the irradiating direction of the laser light.

Also, a light emitting element may be disposed in the tip portion of the light irradiation device to indicate the position of the tip portion by light emitted by wireless power transfer technology. At least a portion of the light emitting element may be formed of a magnetic member. In this case, not only the position of the tip part of the light irradiation device can be indicated by the light emitting member that emits light, but it is also possible to guide at least one of the position and the orientation of the tip portion by generating magnetic force in the light emitting member. Also, the magnetic member can also be used as the position detection member described above. In this case, multiple useful functions are added to the light irradiation device without increasing the number of members.

The laser light source may emit laser light with a wavelength of 300 nm or more and 2000 nm or less. More preferably, the laser light source may emit the laser light with a wavelength of 600 nm or more and 1000 nm or less. In this case, the light irradiation device in the present embodiment is used for a treatment for a disease using a light-sensitive substance, making it easier to obtain an appropriate therapeutic effect.

A light irradiation system in the present embodiment includes a catheter and a light irradiation device. The catheter is formed in an elongated tube shape and is flexible. The light irradiation device is inserted into a lumen of the catheter in use and is also flexible as the catheter. The light irradiation device includes a laser light source in a tip portion of the light irradiation device, and the laser light source is configured to emit laser light in a predetermined wavelength range. The laser light source is further configured to emit laser light in a direction intersecting a longitudinal axial direction of the light irradiation device. A light transmission portion is formed in at least a portion of a side surface of a tip end of the catheter. The light transmission portion is configured to transmit the laser light emitted from the laser light source to exit the catheter.

According to the light irradiation system in the present disclosure, the laser light from the light source can be directly emitted to a particular site of the living body through the light transmission portion of the catheter from the light source disposed in the tip portion without using a light transmission member (for example, an optical fiber). Thus, it is possible to suppress various problems that would occur when an optical transmission member is used (for example, a problem where a light leaks in the optical transmission member or a problem where the characteristics of light change in the process of transmission of the light, etc.). Further, the laser light source emits laser light from the tip portion of the light irradiation device in a direction intersecting the longitudinal axial direction. The laser light exits the light irradiation device through the light transmission portion of the catheter. Accordingly, the light irradiation system in the present disclosure may locally irradiate a specific location of a living body with the laser light emitted from the laser light source. As a result, various problems (for example, occurrence of side effects, etc.) due to light being emitted to an unintended location are also less likely to occur. Thus, a particular position in a lumen of a living body can be irradiated more efficiently and appropriately with light. Note, at least one of the multiple configurations of the light irradiation device described above can be used for the configuration of the light irradiation device used in the light irradiation system.

A portion of the tip end of the catheter to which the laser light source is located close may be made of a material having a thermal conductivity of 0.1 W/m*K or more. In this case, the laser light sources can be easily cooled by blood flow or saline solution, etc. Thus, the possibility that a problem may occur in the laser light source due to heat generated when emitting laser light can be reduced. As a result, treatment can be performed more appropriately.

A cooling fluid may flow into the lumen of the catheter after the light irradiation device was inserted into the catheter. In this case, defects (e.g., a failure in the laser light sources, etc.) due to a temperature increase in the tip portion by the laser light source are appropriately suppressed by the cooling fluid.

The catheter may include a plurality of temperature sensors. Each of the plurality of the temperature measurement positions of the plurality of temperature sensors may be arranged in a respective one of the plurality of portions in the catheter. In this case, useful information can be acquired based on temperature detection results at each of the plurality of measurement positions. For example, it is also possible to confirm the direction in which the laser light is emitted by confirming which of the plurality of measurement positions has a higher temperature than other measurement positions. Also, a health care worker can improve treatment accuracy by more accurately grasping the temperature at each measurement position.

The catheter may include a wire that extends from a base side of the catheter to the tip end. At least one of the wires may be arranged spirally in the catheter. Since the wire is arranged in a spiral shape, the rigidity of the catheter having an elongated shape can be appropriately secured as compared to a situation where the wire is arranged to linearly extend along the axial direction. Thus, the accuracy of treatment can be further improved.

Note that the wire arranged in a spiral shape can be appropriately selected. For example, a wire of the temperature sensor (for example, thermocouples, etc.) may be arranged in a spiral shape. Also, when measurement positions (measurement points) of a plurality of temperature sensors are set in the catheter, the measurement positions of the temperature sensors may be respectively arranged at the multiple positions of the spirally arranged multiple wire. In this case, the measurement positions of the plurality of temperature sensors can be easily and appropriately arranged in the axial direction and the circumferential direction of the catheter having an elongated shape.

Also, at least one of the wires may include a material having radiation opacity. In this case, the position of the catheter can be easily recognized appropriately by radiographic imaging. Note, when a wire having irradiation opacity is arranged in a spiral shape, the position of the catheter can be easily recognized.

The catheter may include a catheter marker having radiation opacity at a position close to the light transmission portion. In this case, a health care worker (for example, a doctor, etc.) can appropriately cause the laser light through the light transmission portion by aligning the position of the laser light source of the light irradiation device to the position of the catheter side maker shown in the image when irradiating a living tissue with the laser light while imaging the inside of the living body using radiation (for example, X-rays, etc.). Thus, the accuracy of treatment can be further improved.

However, it is also possible to eliminate the catheter marker. For example, when the entire area near the tip portion of the catheter is made of a material that transmits laser light, it is possible to easily adjust the direction of emitting the laser light from the laser light source even without the catheter marker.

The catheter may further include a catheter tip end fixed to a tip portion. A through hole in the catheter tip end that penetrates axially through the catheter may be formed to have a diameter smaller than the diameter of the light irradiation device. At least a portion of the catheter tip end may be made of a material having radiation opacity. In this case, a health care worker (for example, a doctor, etc.) can appropriately adjust the catheter to an appropriate position by recognizing the position of the tip end shown in the radiographic image. Thus, the accuracy of treatment can be further improved.

The light transmission portion in the catheter is formed at positions such that the laser light source faces the light transmission portion when the tip portion of the light irradiation device comes into contact with the tip end of the lumen of the catheter. In this case, the position of the laser light source can be automatically aligned with the position of the light transmission portion by just pushing the light irradiation device into the catheter until the light irradiation device comes into contact with the tip end of the lumen of the catheter. Thus, treatment can be performed more appropriately.

Hereinafter, a plurality of typical embodiments according to the present disclosure will be described with reference to the drawings. A light irradiation system 1 in the present embodiment may be used by being inserted into a living body's lumen (e.g., a blood vessel, a lymph gland, a urethra, an airway, a digestive organ, a secretory gland, and a reproductive organ, etc.). The light irradiation system 1 irradiates a biological tissue with a light (a laser light in this embodiment) while being inserted into a lumen of a living tissue. The light irradiation system may be used for at least any therapy such as PDT (photodynamic therapy) and NIR-PIT (Near-Infrared Photoimmunotherapy).

The light irradiation system 1 in the present embodiment includes a light irradiation device 2 and a catheter 3. When using the light irradiation system 1, the catheter 3 is inserted into a biological lumen first. Next, the light irradiation device 2 is inserted into a lumen 311 of the catheter 3 having an elongated tube shape. When insertion is completed, the biological tissue is irradiated with light emitted from the light irradiation device 2. However, it is also possible to independently use only the light irradiation device 2 without using the catheter 3.

XY axes orthogonal to each other are shown in FIG. 1 to FIG. 3 and FIG. 8 to FIG. 11. In these drawings, the lower side of the drawing (+X direction) is a "tip side," the upper side of the drawing (−X direction) is a "base side," the left side of the drawing (+Y direction) is a "left side," and the right side of the drawing (−Y direction) is a "right side". The light irradiation system 1, the light irradiation device 2, and the catheter 3 are inserted into the biological lumen from the tip side thereof. The base side of the system 1 is operated by a health care worker (for example, a doctor, etc.).

(Light Irradiation Device)

Refer to FIGS. 1 to 5, the light irradiation device 2 in this embodiment will be described. As shown in FIG. 1, the light irradiation device 2 is an elongated shape. The light irradiation device 2 includes a connector 201, a shaft 210, and a tip end 220. The connector 201 is located on the base side of the light irradiation device 2 and is held by an operator. The connector 201 includes a pair of blades 202 and a connecting portion 203. The connecting portion 203 has a substantially cylindrical shape. The blades 202 are connected to a base end of the connecting portion 203. A shaft 210 is connected to a tip of the connecting portion 203. Note that the blades 202 and the connecting portion 203 may be integrally formed.

The shaft 210 is preferably antithrombotic, flexible, and biocompatible. At least one of a resin material and a metal material, etc., may be used as a material for the shaft 210. For example, a polyamide resin, a polyolefin resin, a polyester resin, a polyurethane resin, a silicon resin, or the like may be used as a resin material. As a metal material, a stainless steel such as SUS 304, a nickel-titanium alloy, a cobalt-chromium alloy, a tungsten steel, etc., may be used. Note, the shaft 210 may be made by combining multiple materials.

The shaft 210 is an elongated member extending along an axis O2. Various types of wires, etc. (for example, wires 231A, 231B, etc., as will be described later) are disposed inside the shaft 210. The tip end 220 is connected to the tip portion of the shaft 210. The tip end 220 has a substantially cylindrical shape. The outer diameter of the tip end 220 is approximately the same as the outer diameter φ1 of the shaft 210.

Figure 2:
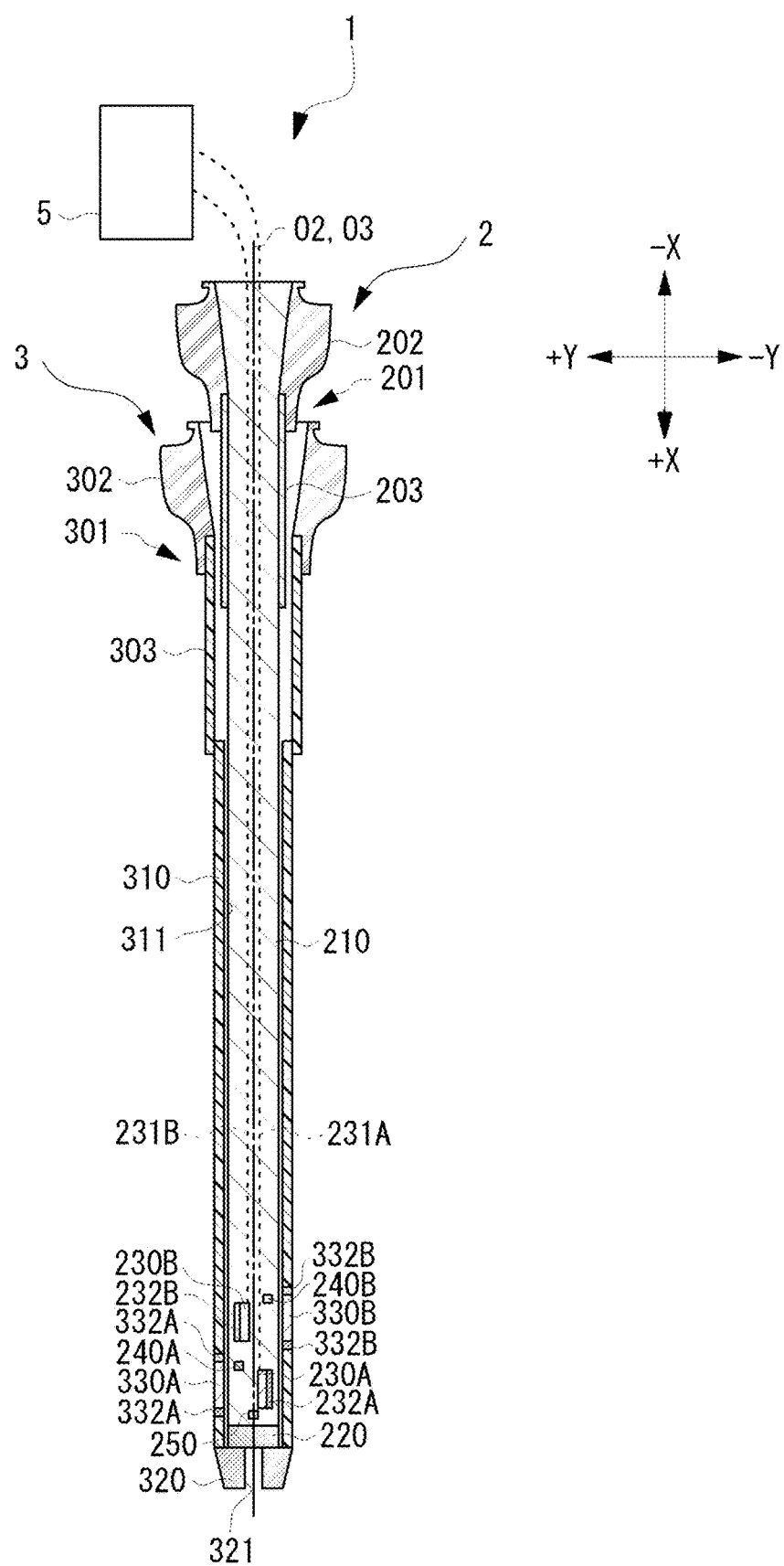
FIG. 2 is a longitudinal cross-sectional view of the light irradiation system 1 where the light irradiation device is attached to the catheter 3 (a used state).
Figure 3:
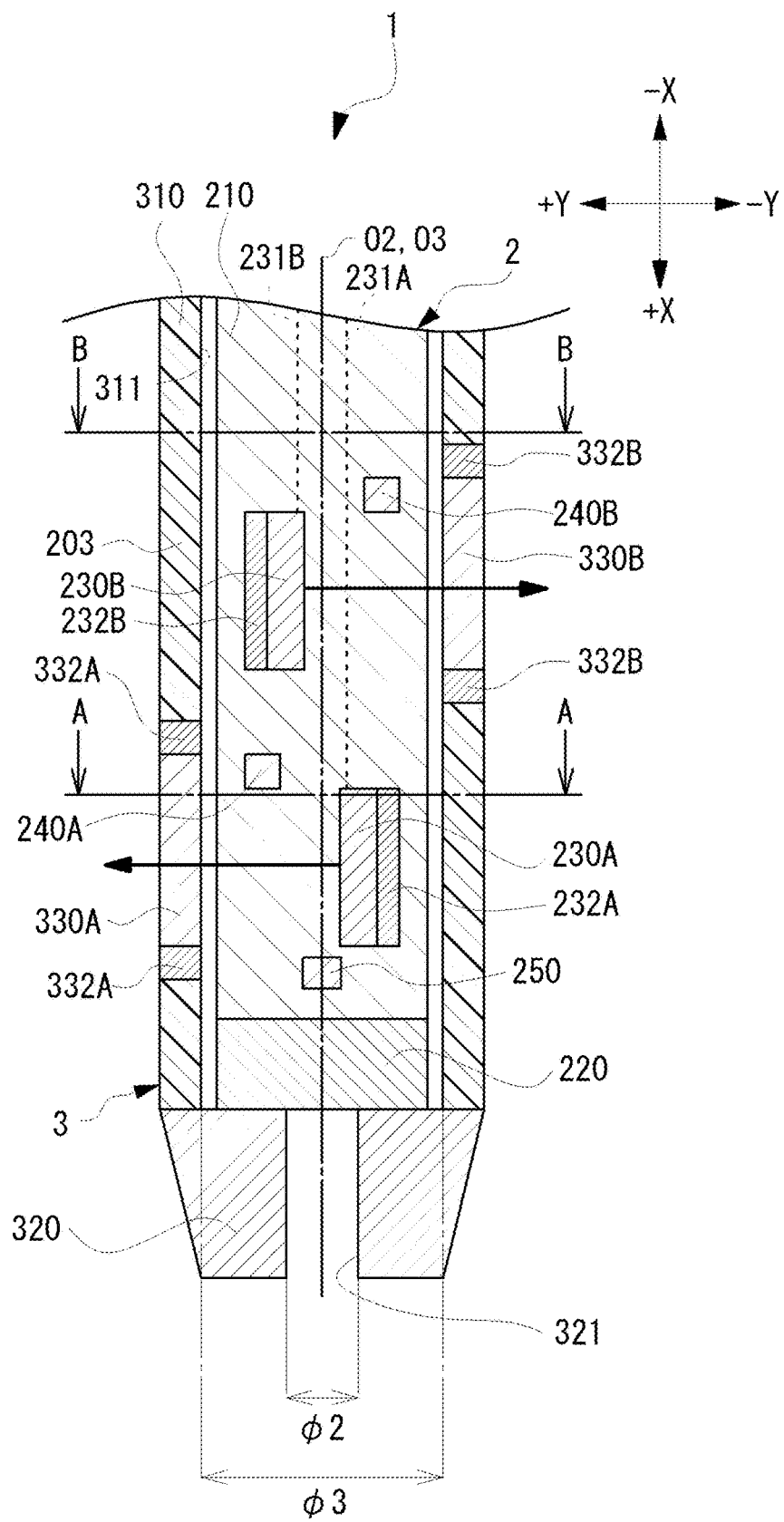
FIG. 3 is an enlarged longitudinal cross-section around the tip portion of the light irradiation system 1 in FIG. 2.

Referring to FIG. 3, the configuration of a tip portion of the light irradiation device 2 in this embodiment is explained. FIG. 3 is an enlarged longitudinal cross-section around the tip portion of the light irradiation system 1 shown in FIG. 2. As shown in FIG. 3, the tip portion of the light irradiation device 2 has small laser light sources 230 (230A, 230B) emitting laser light in a predetermined wavelength range. The laser light source 230 is housed in the elongated shaft 210 (which may also be referred to as a "device body"). However, the method for fixing the laser light sources 230 may be changed. For example, the shaft may be formed in the shape of a long tube having a lumen therein. In this case, the laser light sources 230 (230A, 230B) may be fixed to the inner wall of the lumen of the shaft.

Each of the laser light sources 230 (230A, 230B) emits laser light in a direction intersecting a longitudinal axis direction (the direction along the axis O2) of the light irradiation device 2 (the arrow direction perpendicular to the axis O2 as shown in FIG. 3). Thus, the light irradiation device 2 can directly irradiate a specific location of a living body from the laser light source 230 disposed at the tip portion without an optical transmission member such as an optical fiber. Thus, it is possible to suppress various problems that would occur when an optical transmission member is used (for example, a problem such as a light leakage or attenuation in the optical transmission member or a problem such as changes in the characteristics of light during the process of light being transmitted, etc.). Also, the laser light source 230 emits laser light from the tip portion of the light irradiation device 2 in a direction intersecting the direction of the axis O2. Compared to a light emitting diode, the laser light source 230 may easily emit light that has high directivity and is less likely to diverge. Accordingly, the light irradiation device 2 of the present embodiment may selectively and locally irradiate a specific location of a living body with laser light emitted from the laser light source 230. As a result, various problems (for example, occurrence of side effects, etc.) due to light being emitted to an unintended location are also less likely to occur. Furthermore, the laser light source 230 has characteristics to emit light having a wavelength with a narrower spectral range as compared to a light emitting diode. Thus, by providing the laser light sources 230 at the tip portion of the light irradiation device 2, occurrence of various problems (for example, reduction in irradiation efficiency, unintended tissue degeneration, etc.) due to irradiation of a tissue with a light having a wavelength different from the wavelength necessary for treatment (for example, the excitation wavelength of a light-sensitive substance, etc.) can be also suppressed. Thus, a particular position in a lumen of a living body can be irradiated more efficiently and appropriately with light.

A surface-emitting laser that emits laser light in a direction perpendicular to its substrate can be used as the laser light source 230. By using the surface-emitting laser, laser light is appropriately emitted with a small power, and the light irradiation device 2 is also highly resistant to temperature changes. Furthermore, since the surface-emitting laser can emit laser light in a direction perpendicular to the substrate surface, it is easier to adjust the irradiation position of the laser light more accurately.

Also, a semiconductor laser, which is a circuit element manufactured using semiconductors as a material, may be used as the laser light source 230. Since such a semiconductor laser is easily miniaturized, the semiconductor laser can be appropriately incorporated into the light irradiation device 2 having a small diameter. Also, the semiconductor laser can emit highly directional laser light with a consistent phase with a small amount of power. Thus, the therapeutic effects can be also stabilized.

As shown in FIG. 3, the light irradiation device 2 in this embodiment includes a plurality of laser light sources 230A, 230B at the tip portion of the device 2. Since the multiple laser light sources 230A, 230B are disposed in a single light irradiation device 2, the degree of freedom of laser irradiation (for example, ease of adjusting at least one of a laser irradiating area, an irradiation density, an irradiation direction, etc.) can be improved as compared to only a single laser light source being used. As a result, an appropriate therapeutic effect can be obtained even more easily.

Figure 4:
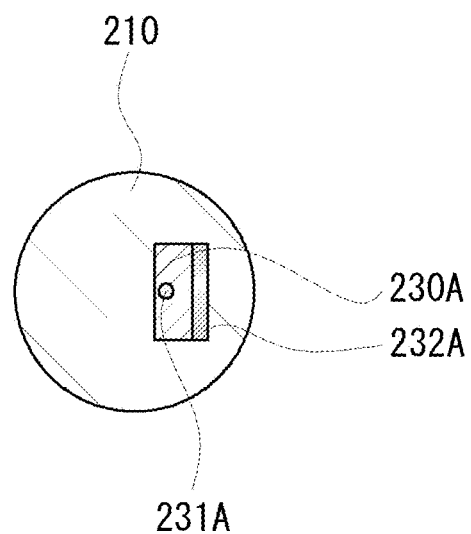
FIG. 4 is a cross-sectional aerial view taken by the A-A line in FIG. 3.
Figure 5:
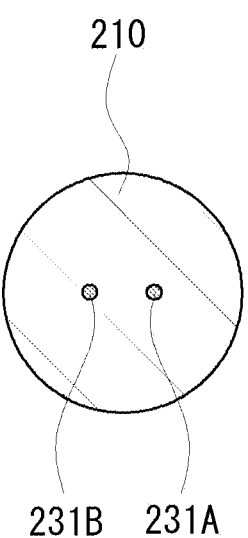
FIG. 5 is a cross-sectional aerial view taken by the B-B line in FIG. 3.

The wire 231A extending from a control unit 5 (see FIG. 1 and FIG. 2) is connected to the laser light source 230A. Also, the wire 231B extending from the control unit 5 is connected to the laser light source 230B. Power to the laser light sources 230A, 230B is supplied via the wires 231A, 231B. The wires 231A, 231B are disposed to extend along the longitudinal axial direction (the direction of the axis O2) of the light irradiation device 2. However, as details will be described later, each of the wires 231A, 231B may be arranged to have a spiral shape, etc. In this embodiment, the wires 231A, 231B extend from the control unit 5 and is connected to the laser light sources 230A, 230B through the inside of the light irradiation device 2. In FIGS. 1 to 3, the wires 231A, 231B are shown as dotted lines. FIG. 4 is a cross-sectional aerial view taken by the A-A line in FIG. 3. FIG. 3 shows the laser light source 230A to which the wire 231A is connected. Also, FIG. 5 is a cross-sectional aerial view taken by the B-B line in FIG. 3. FIG. 5 shows a cross-section of each of the two wires 231A, 231B passing through the inside of the shaft 210.

In this embodiment, the emission of laser light from at least one of the multiple laser light sources 230A and 230B can be controlled independently of other laser light sources. In other words, the control unit 5 can independently control the emission of laser light from each of the two laser light sources 230A and 230B. As a result, the degree of freedom of laser irradiation is further improved.

Specifically, as shown in FIG. 3, the orientation of each laser light source 230A, 230B is set so that the direction of laser light irradiation by each of the plurality of laser light sources 230A, 230B is different from each other. Specifically, the irradiating surface of the laser light source 230A faces in the +Y direction, and the irradiating surface of the laser light source 230B faces in the −Y direction. Accordingly, the emission of laser light by the two laser light sources 230A and 230B is independently controlled by the control unit 5, whereby the emission direction of the laser light can be appropriately changed. Thus, the degree of freedom of treatment is further improved.

In this embodiment, each of the laser light sources 230A, 230B emits laser light in the same wavelength range. Thus, the light irradiation device 2 can irradiate a specific location with laser light in the same wavelength range having a higher degree of freedom (that is, by selecting an appropriate direction of emitting the laser light). As a result, an appropriate therapeutic effect can be obtained.

The laser light source 230 may emit laser light with a wavelength of 300 nm or more and 2000 nm or less. More preferably, the laser light source 230 may emit laser light with a wavelength of 600 nm or more and 1000 nm or less. In this case, the light irradiation device 2 is used for a treatment for a disease using a light-sensitive substance, making it easier to obtain an appropriate therapeutic effect. Note that in this embodiment, the center wavelength of the laser light emitted by the laser light source 230 is approximately 690 nm.

In this embodiment, the laser light sources 230A, 230B are housed in a portion of the elongated shaft (i.e., the device body) 210, and at least the portion of the shaft 210 is made of a material that transmits laser light emitted from the laser light sources 230A, 230B. By housing the laser light sources 230A, 230B in the shaft 210, the laser light sources 230A, 230B can be held in the shaft 210 in a stable state as compared to a situation where the laser light sources 230A, 230B are exposed to an outside of the shaft 210. Furthermore, a problem such as a failure in the laser light sources 230A, 230B is also less likely to occur. Furthermore, laser light emitted from the laser light sources 230A, 230B penetrates through the material of the shaft 210, and can appropriately reach the living tissue. Thus, treatment can be performed more appropriately.

Note, in this embodiment, the shaft 210 is entirely made of a material that transmits the laser light emitted by the laser light sources 230A, 230B. Thus, as compared to a situation where only a part of the shaft 210 is made of a material having laser light transparency, the configuration of the shaft 210 can be simplified, and laser light is less likely to be blocked by the shaft 210.

By performing a first evaluation test and a second evaluation test (both of which will be described later), the inventors of the present application have newly discovered a desirable range of light irradiation density of laser light emitted from the laser light sources 230A, 230B at the time of the laser light exiting the light irradiation device 2. In this embodiment, the light irradiation density of laser light emitted from the laser light sources 230A, 230B at the time of the laser light exiting the light irradiation device 2 is 80 W/cm$^2$ or more and 1,600 W/cm$^2$ or less based on the evaluation test results. In this case, treatment effects by irradiating the light-sensitive substance with the laser light can easily be obtained appropriately. Note that the light irradiation density at the time of the laser light exiting the light irradiation device 2 is more preferably 300 W/cm$^2$ or more and 1,300 W/cm$^2$ or less, and more preferably 600 W/cm$^2$ or more and 1,300 W/cm$^2$ or less. As an example, in this embodiment, the light irradiation density at the time of the laser light exiting the light irradiation device 2 is approximately 1,273 W/cm$^2$.

As shown in FIG. 3, etc., the light irradiation device 2 in this embodiment includes light source position markers 232A, 232B having radiation opacity at the tip portion where the laser light sources 230A, 230B are disposed. Thus, a health care worker (for example, a surgeon, etc.) can appropriately adjust the irradiating position of laser light by checking the positions of light source position markers 232A, 232B shown in the image when irradiating a living tissue with laser light while imaging the inside of the living body using radiation (for example, X-rays, etc.). Thus, the accuracy of treatment can be further improved.

More specifically, in the present embodiment, at least a part of each of the laser light sources 230A, 230B is made of a material having radiation opacity to serve as the light source position marker 232A, 232B. Thus, although markers are not separately provided from the laser light sources 230A and 230B, the positions of the laser light sources 230A, 230B can be appropriately recognized through radiographic imaging. Furthermore, since the laser light sources 230A, 230B themselves serve as the light source position markers 232A, 232B, the positions of the laser light sources 230A, 230B can be more accurately recognized by health care workers. Thus, treatment can be performed more appropriately. As one example, in this embodiment, the laser light sources 230A, 230B each have a multi-layer structure, and one or some of the multiple layers are made of a material having radiation opacity. Thus, the positions of laser light sources 230A, 230B can be determined more accurately.

Furthermore, in this embodiment, at least a part of the tip end 220 provided at the tip portion of the light irradiation device 2 (the entire tip end 220 in this embodiment) is made of a material having radiation opacity to serve as a marker. Thus, the position of the tip portion of the light irradiation device 2 can be appropriately recognized without separately forming a marker.

As shown in FIG. 3, etc., the light irradiation device 2 includes optical sensors 240 (240A, 240B) at the tip portion of the device 2. Thus, the state of light in the tip portion of the light irradiation device 2 is directly detected by the optical sensors 240 at the tip portion. In other words, changes in the characteristics of light that may occur during the transmission process are unlikely to occur in light detected by the optical sensors 240. Thus, the state of the light can be detected more accurately and easily. Note, in this embodiment, the optical sensor 240A that detects light emitted by the laser light source 230A (including reflected light, etc.) and the optical sensor 240B that detects light emitted by the laser light source 230B are separately disposed. Thus, the state of light from each of the two laser light sources 230A and 230B is appropriately detected. Since the multiple optical sensors 240 are provided, the direction in which light was actually emitted can be confirmed. Note, in order to simplify the illustration, the wire extending from the optical sensor 240 is not illustrated.

As shown in FIG. 3, etc., the tip portion of the light irradiation device 2 in this embodiment includes a position detection member 250 for detecting the position of the tip portion of the light irradiation device 2 that is inserted into the lumen of a living body. Thus, by detecting the position of the position detection member 250, the position of the tip portion of the light irradiation device 2 that is inserted into the lumen of a living body can be easily obtained. Note, various types of members for detecting the position within the lumen can be used as the position detection member 250. For example, when a small ultrasonic oscillator is used as the position detection member 250, the position detection member 250 is detected by using an ultrasonic diagnostic device or the like. Also, when a magnetic member is used as the position detection member 250, the position of the position detection member 250 is detected using a magnetic sensor or the like.

Note that the light irradiation device 2 may include a magnetic member (e.g., the position detection member 250, etc.) in the tip portion of the device 2. The magnetic member may serve as a guide member to guide at least one of a position and an orientation (a direction) of the tip portion of the light irradiation device 2 within a lumen of a living body by a magnetic force generated by the magnetic member placed in a magnetic field. In this case, while the light irradiation device 2 is inserted into the lumen of a living body, at least one of the position and orientation of the tip portion is appropriately guided.

Note that by using the position detection member 250 described above as the magnetic member, the position detection member 250 may also serve as a guide member. In this case, multiple useful functions are added to the light irradiation device 2 without increasing the number of members.

Also, the magnetic members 232A, 232B may be disposed at least parts of the laser light sources 230A, 230B (in this embodiment, parts of the laser light sources 230A, 230B opposite to the parts of the laser light sources 230A, 230B that emit laser light). In this case, the orientation of each of the magnetic members 232A, 232B respectively disposed in the laser light sources 230A, 230B (that is, the circumferential direction about the axis O2 of the light irradiation device 2) is adjusted by magnetic force, making it easier to properly control the irradiating direction of the laser light.

Note that the light source position markers 232A, 232B may also serve as the magnetic members. Furthermore, the magnetic members may be provided separately from the light source position markers 232A, 232B.

In addition, a light emitting element may be disposed in the tip portion of the light irradiation device 2 to indicate the position of the tip portion by light emitted using wireless power transfer technology. For example, the position detection member 250 described above may be the light emitting element. When such a light emitting element is used, at least a part of the light emitting element may be made of a magnetic material. In this case, not only the position of the tip part of the light irradiation device can be indicated by the light emitting member that emits light, but it is also possible to guide at least one of the position and the orientation of the tip portion by generating magnetic force in the light emitting member.

(Catheter)

Referring to FIGS. 1 to 3, FIG. 6, and FIG. 7, the catheter 3 in this embodiment will be described. As shown in FIG. 1, the shape of the catheter 3 has an elongated tube shape. The catheter 3 includes a connector 301, a shaft 310, and a tip end 320. The connector 301 is located on a base side of the catheter 3 and is held by an operator (i.e., a surgeon). The connector 301 includes a pair of blades 302 and a connecting portion 303. The connecting portion 303 has a substantially cylindrical shape. The blades 302 are connected to a base end of the connecting portion 303. The shaft 310 is connected to a tip of the connecting portion 303. Note that the blades 302 and the connecting portion 303 may be integrally formed.

The shaft 310 is preferably antithrombotic, flexible, and biocompatible, similar to the shaft 210 of the light irradiation device 2. A similar material to the shaft 210 of the light irradiation device 2 can be used for the shaft 310. The shaft 310 has an elongated tube shape extending along an axis O3. The shaft 310 in this embodiment is formed in a hollow cylinder shape with both the tip and base ends being open. The lumen 311 in the shaft 310 serves as a guide wire lumen for inserting a guide wire into the catheter 3 during delivery of the catheter 3. The lumen 311 serves as a device lumen for inserting the light irradiation device 2 into the catheter 3 after delivery of the catheter 3.

The tip end 320 is connected to a tip portion of the shaft 310. The tip end 320 has an outer shape that tapers in diameter from the base side to the tip side in order for the catheter 3 to advance smoothly in a biological lumen. A through hole 321 passing through the tip end 320 in a direction of the axis O2 is formed approximately at the center of the tip end 320. As shown in FIG. 3, the inner diameter $\phi 2$ of the through hole 321 is smaller than the inner diameter $\phi 3$ of the lumen 311 of the shaft 310, and smaller than the outer diameter $\phi 1$ of the shaft 210 and tip end 220 of the light irradiation device 2. Also, the outer diameter $\phi 1$ of the shaft 210 and tip end 220 of the light irradiation device 2 is smaller than the inner diameter $\phi 3$ of the lumen 311 of the catheter 3. Accordingly, the light irradiation device 2 moves within the lumen 311 of the catheter 3 along the axis O2. When the light irradiation device 2 is sufficiently inserted in the lumen 311 of the catheter 3, the tip end 220 of the light irradiation device 2 comes into contact with the tip end 320 of the catheter 3, whereby positioning of the light irradiation device 2 with respect to the catheter 3 in the direction of axes O2 and O3 is fixed.

Figure 6:
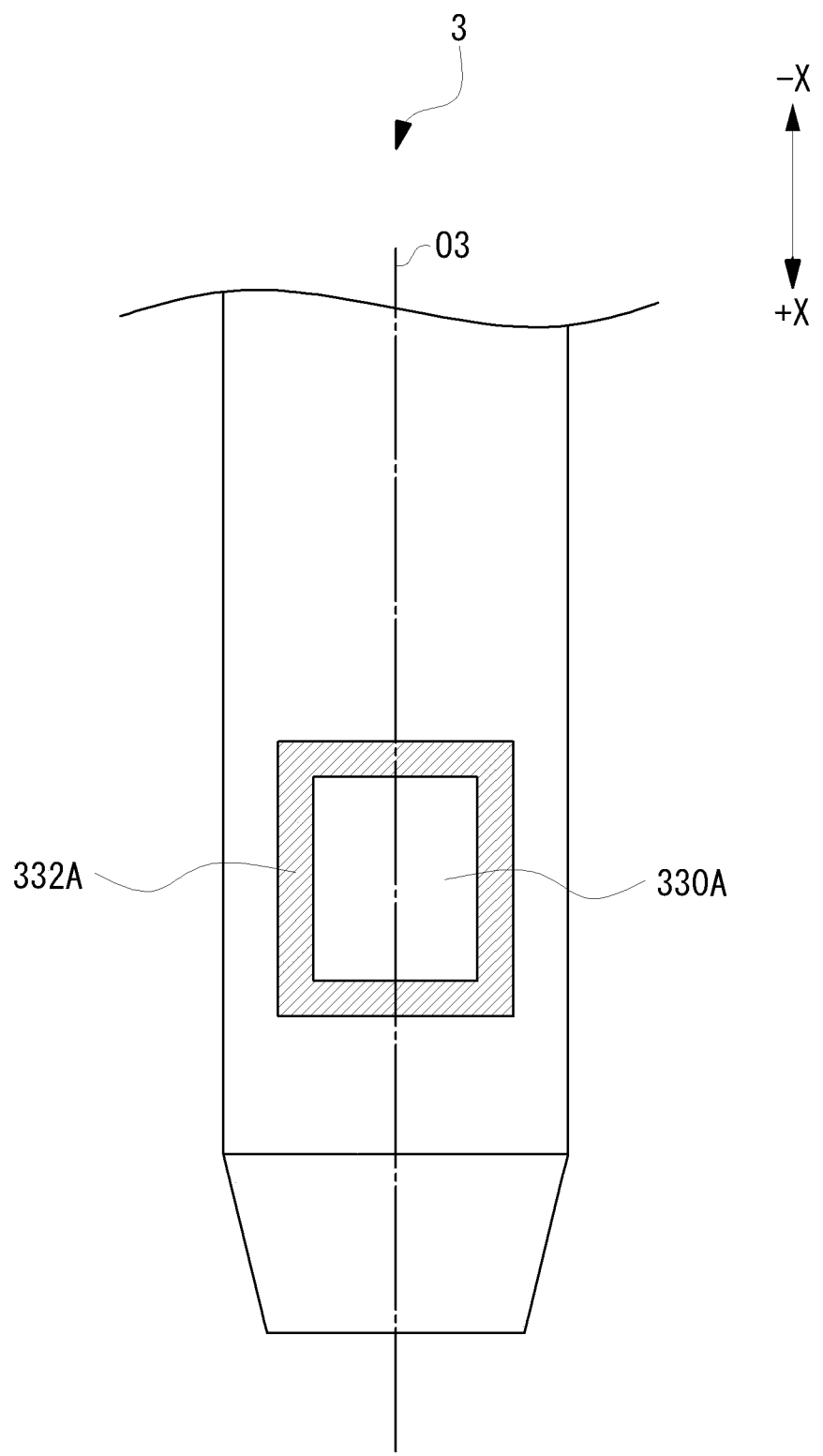
FIG. 6 is a diagram showing one example of a catheter marker 332A disposed in the catheter 3.
Figure 7:
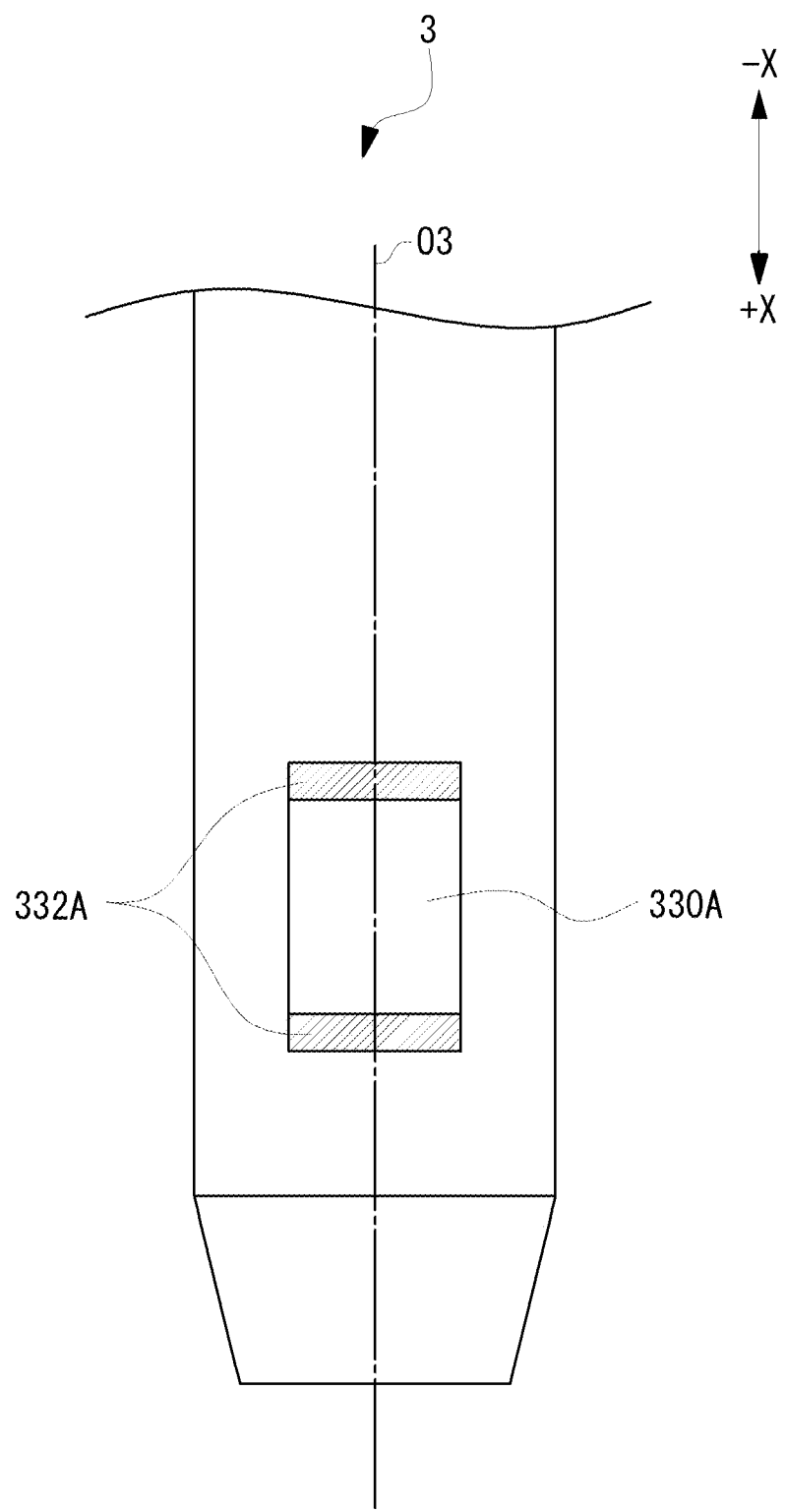
FIG. 7 is a diagram showing one example of the catheter marker 332A disposed in the catheter 3.

Referring to FIG. 3, FIG. 6, and FIG. 7, the configuration of the tip portion of the catheter 3 in this embodiment will be described. As shown in FIG. 3, light transmission portions 330A, 330B that transmit laser light emitted by the laser light sources 230A, 230B of the light irradiation device 2 are formed on a tip side surface (a part of a side surface of the tip side in this embodiment) of the shaft 310 in the catheter 3. Thus, the light irradiation system 1 in the present embodiment can selectively irradiate a specific location of a living body with laser light emitted in a direction intersecting the axes O2, O3 from the laser light sources 230A, 230B of the light irradiation device 2.

Note, in this embodiment, the light transmission portions 330A, 330B are formed by partially making parts of the shaft 310 of the catheter 3 through which the laser light emitted from the laser light sources 230A, 230B passes with a material that transmits the laser light. However, the configuration of the light transmission portion may be changed. For example, the light transmitting portion may be formed in the catheter by making the entire shaft 310 or the entire tip portion of the shaft 310 with a material that transmits laser light.

Each of catheter markers 332A, 332B having radiation opacity is disposed at a position of the shaft 310 of the catheter 3 close to the respective light transmission portion 330A, 330B. Thus, a health care worker (for example, a surgeon, etc.) can appropriately have the laser light emitted through the light transmission portions 330A, 330B by aligning positions of the laser light sources 230A, 230B of the light irradiation device 2 to the positions of the catheter side makers 332A, 332B shown in the radiation image when irradiating a living tissue with laser light while imaging the inside of the living body using radiation (for example, X-rays, etc.). Thus, the accuracy of treatment can be further improved.

Note that the specific configuration of the catheter markers 332A, 332B can be selected as appropriate. For example, as shown in FIG. 6, the catheter marker 332A may be formed to surround the light transmission portion 330A. In this case, a health care worker can more accurately recognize the position of the light transmission portion 330A by confirming the area surrounded by the catheter marker 332A shown in the radiographic images. Note that each of the catheter markers 332A, 332B surrounding the light transmission portions 330A, 330B may have a shape other than a rectangular shape (for example, a ring shape, etc.).

Also, as shown in FIG. 7, the catheter markers 332A may be disposed adjacent to both the tip side and the base side of the light transmission portion 330A. In this case, a health care worker can appropriately recognize the position of the light transmission portion 330A in the direction along the axes O2 and O3. Also, a single catheter marker 332A, 332B may be disposed in either the tip side or the base side of the light transmission part 330A.

As shown in FIG. 3, in this embodiment, at least a part of the tip end 320 provided at the tip portion of the shaft 310 of the catheter 3 (the entire tip end 320 in this embodiment) is made of a material having radiation opacity to serve as a marker. Thus, the position of the tip portion of the catheter 3 can be appropriately recognized.

Note that the catheter 3 may be provided with a magnetic member (for example, the tip end 320, etc.) at the tip portion. The magnetic member may serve as a guide member to guide at least one of a position and an orientation (a direction) of the tip portion of the catheter 3 within a lumen of a living body by a magnetic force generated by the magnetic member placed in a magnetic field. In this case, while the catheter 3 is inserted into the lumen of a living body, at least one of the position and orientation of the tip portion is appropriately guided.

Note, by using the tip end 320 described above as a magnetic member, the tip end 320 may also serve as a guide member. In this case, multiple useful functions are added to the catheter 3 without increasing the number of members.

At least a portion of the tip side of the shaft 310 of the catheter 3 to which the laser light sources 230A, 230B of the light irradiation device 2 are located close is made of a material having a thermal conductivity of 0.1 W/m*k or more (in this embodiment, the entire shaft 310). Therefore, the laser light sources 230A, 230B can be easily cooled by blood flow or saline solution, etc. Thus, a failure due to heat generated from the laser light sources 230A, 230B emitting laser light is less likely to occur in the laser light sources 230A, 230B. Thus, treatment can be performed more appropriately.

(Usage)

One example of usage of the light irradiation system 1 in this embodiment is described. First, the operator inserts a guide wire (not shown) into a biological lumen. Next, the operator inserts the base side of the guide wire from the through hole 321 of the tip end 320 of the catheter 3 into the lumen 311, and then pulls out the guide wire from the base side of the connector 301. The operator pushes the catheter 3 into the biological lumen along the guide wire and moves at least one of the light transmission portions 330A, 330B of the catheter 3 to the target site for light irradiation. It should be noted that, when moving the catheter 3 within the biological lumen, the operator can appropriately move the catheter 3 to the target site by confirming the positions of the catheter markers 332A, 332B shown in the radiographic images. The operator then removes the guide wire from the catheter 3.

Next, the operator inserts the light irradiation device 2 from the base side opening of the connector 301 of the catheter 3, and pushes the light irradiation device 2 along the lumen 311 of the catheter 3 in the biological lumen. When the light irradiation device 2 is sufficiently pushed in the lumen 311 of the catheter 3, the tip end 220 of the light irradiation device 2 comes into contact with the tip end 320 of the catheter 3. As shown in FIG. 3, the light transmission portions 330A, 330B in the catheter 3 are formed at positions such that the laser light sources 230A, 230B face the corresponding light transmission portions 330A, 330B when the tip end 220 of the light irradiation device 2 is in contact with the tip of the lumen of the catheter 3 (i.e., the tip end 320 of the catheter 3). Thus, the light irradiation device 2 is simply pushed forward until the device 2 comes into contact with the tip end 320 of the catheter 3, and the positions of the laser light sources 230A, 230B are automatically aligned with the positions of the corresponding light transmission portions 330A, 330B. In this state, laser light is emitted from the laser light sources 230A, 230B, and the target site is selectively irradiated with the laser light.

The operator puts cooling fluid into the lumen 311 of the catheter 3 after the light irradiation device 2 was inserted into the catheter 3. Thus, defects (e.g., a failure in the laser light sources 230A, 230B, etc.) due to a temperature increase in the tip portion by the laser light sources 230A, 230B are appropriately suppressed by the cooling fluid.

(Modifications)

The technology disclosed in the above embodiments is only one example. Accordingly, it is also possible to change the technology exemplified in the above embodiments. Referring to FIGS. 8 to 11, modifications to the above embodiments will be described. Note, it is possible to adopt a configuration similar to the embodiment described above for a part of each of a first modification shown in FIG. 8, a second modification shown in FIG. 9, a third modification shown in FIG. 10, and a fourth modification shown in FIG. 11. Accordingly, among the configurations of the first to fourth modifications, parts that can adopt a configuration similar to the embodiment described above are given the same number as the above embodiment, and the description is omitted or simplified.

Figure 8:
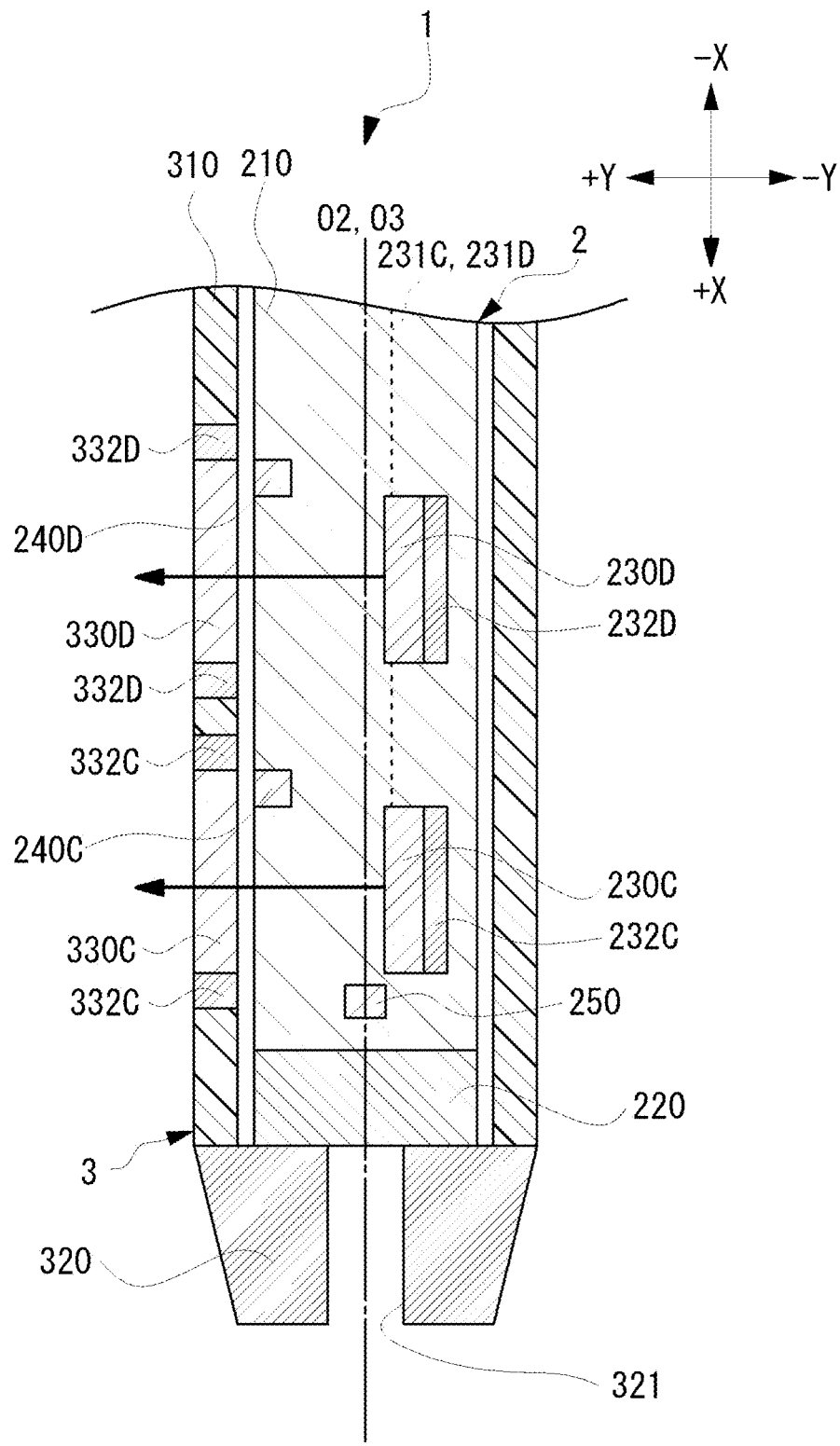
FIG. 8 is an enlarged longitudinal cross-section around the tip portion of the light irradiation system 1 according to a first modification.

In a light irradiation system 1 according to the first modification shown in FIG. 8, multiple laser light sources 230C, 230D emit laser light in different wavelength ranges. Also, the orientation of each laser light source 230C, 230D is determined so that the laser light emitting direction of each of the multiple laser light sources 230C and 230D is in parallel with each other. A control unit 5 can independently control the emission of laser light of the two laser light sources 230C and 230D. Thus, the light irradiation system 1 of the first modification can selectively emit laser light in different wavelength ranges to a living tissue.

Note, the configuration of the light irradiation system 1 in the first modification may be further changed. For example, in the light irradiation system 1 shown in FIG. 8, laser light emission by the multiple laser light sources 230C and 230D may be controlled collectively. Also, the multiple laser light sources 230C and 230D may emit laser light in the same wavelength range. In this case, the irradiation area of laser light can be expanded as compared to only one laser light source being used.

Figure 9:
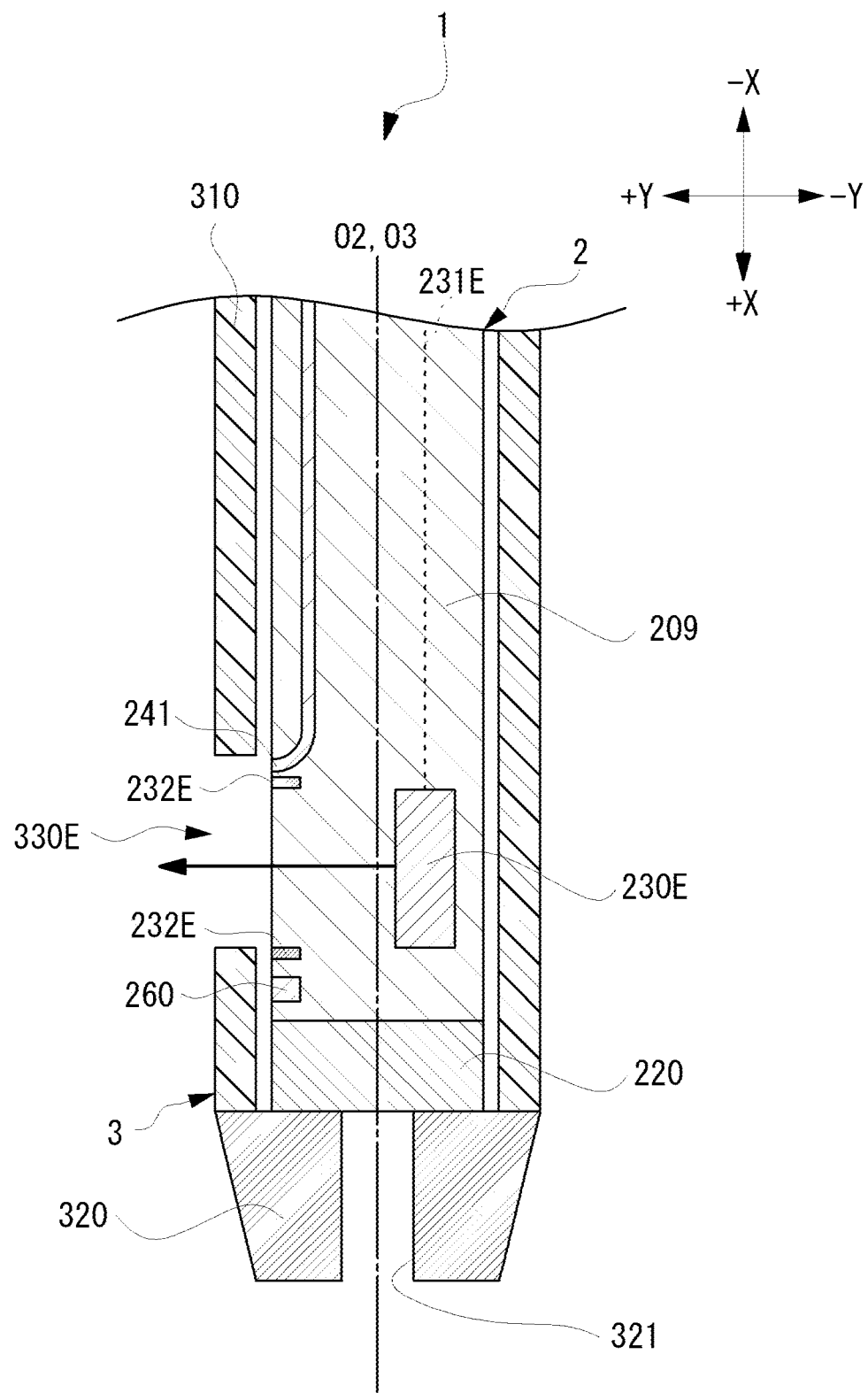
FIG. 9 is an enlarged longitudinal cross-section around the tip portion of the light irradiation system 1 according to a second modification.

The light irradiation device 2 according to the second modification shown in FIG. 9 includes a single laser light source 230E. As described above, the number of laser light sources provided in the light irradiation device 2 may be one or multiple. Also, in the second modification, markers 232E having radiation opacity are disposed in both the tip side and the base side at the positions where laser light from the laser light source 230E exits the device body 209 of the light irradiation device 2. As described above, the markers 232E may be disposed separately from the laser light source 230E.

The light irradiation device 2 in the second modification is provided with a light detection transmission member 241 that transmits light entering the tip portion (near the position where laser light exits in this modification) to a optical sensor (not shown). The light detection transmission member 241 in this modification is an optical fiber, is inserted from a side of the device body 209 to the base side, and is connected to the optical sensor. In the second modification, the state of the light at the tip portion is appropriately detected while avoiding complication of the configuration of the tip portion of the light irradiation device 2 due to the optical sensor.

The light irradiation device 2 in the second modification includes a temperature sensor 260 in the tip portion of the device 2. Thus, for example, at least one of a temperature increase due to operation of the laser light source 230E provided in the tip portion and a temperature increase due to laser light being emitted to a living tissue can be appropriately detected.

In the catheter 3 of the second modification, a light transmission portion 330E (which can also be referred to as a "laser light transmission window") is formed by opening a part of the shaft 310. Laser light emitted by the laser light source 230E passes through the light transmission portion 330E. As described above, the method for forming the light transmission portion is not necessarily limited to the method using a material that transmits laser light.

Figure 10:
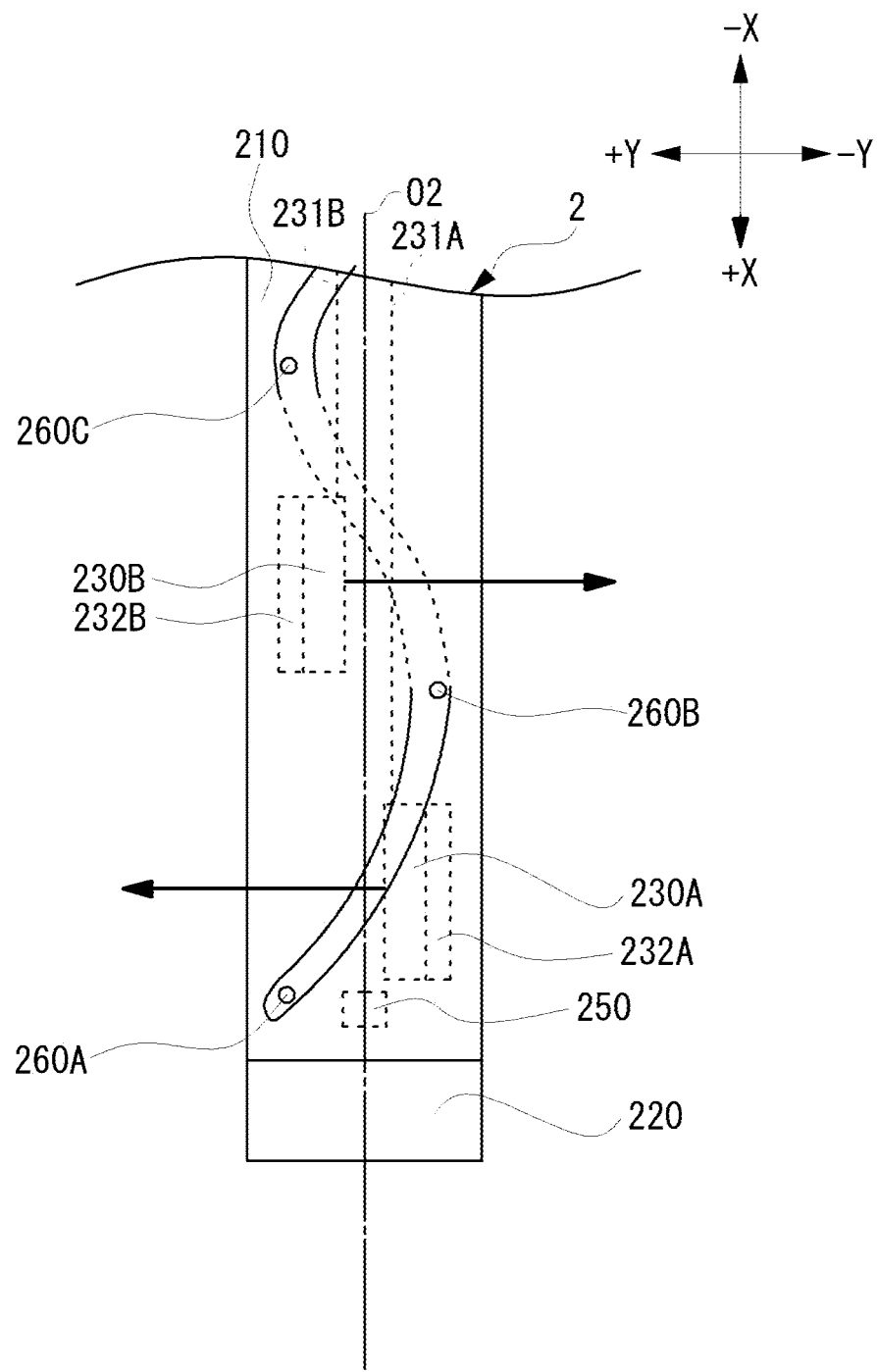
FIG. 10 is an enlarged longitudinal cross-section around the tip portion of the light irradiation device 2 according to a third modification.

The light irradiation device 2 according to the third modification shown in FIG. 10 includes a plurality of temperature sensors 260 (260A, 260B, 260C). The measurement positions (the measurement points indicated by 260A, 260B, and 260C in this modification) of the plurality of temperature sensors 260 are respectively arranged in a plurality of portions of the tip portion of the light irradiation device 2. Thus, useful information can be acquired based on temperature detection results at each of the plurality of measurement positions. For example, it is also possible to confirm the direction in which the laser light is emitted by confirming which of the plurality of measurement positions has a higher temperature than other measurement positions. Also, a health care worker can improve treatment accuracy by more accurately grasping the temperature at each measurement position.

In the light irradiation device 2 of the third modification, a wire of the temperature sensor 260 is arranged spirally in the main body of the light irradiation device 2. Thus, the rigidity of the light irradiation device 2 having an elongated shape can be appropriately secured as compared to the wire that linearly extends along the axial direction. Thus, the accuracy of treatment can be further improved. As one example, in this modification, an elongated thermocouple having multiple measurement points is used as the temperature sensor 260. By arranging the wire of the elongated temperature sensor 260 in a spiral shape, the rigidity of the light irradiation device 2 is secured.

In the light irradiation device 2 of the third modification, the wire of the temperature sensor 260 includes a material having radiation opacity. Thus, the position of the elongated light irradiation device 2 can be easily recognized appropriately by radiographic imaging. Note, in the third modification, the wire of the temperature sensor 260 having radiation opacity extends in a spiral shape, making it easier to recognize the position of the light irradiation device 2.

Figure 11:
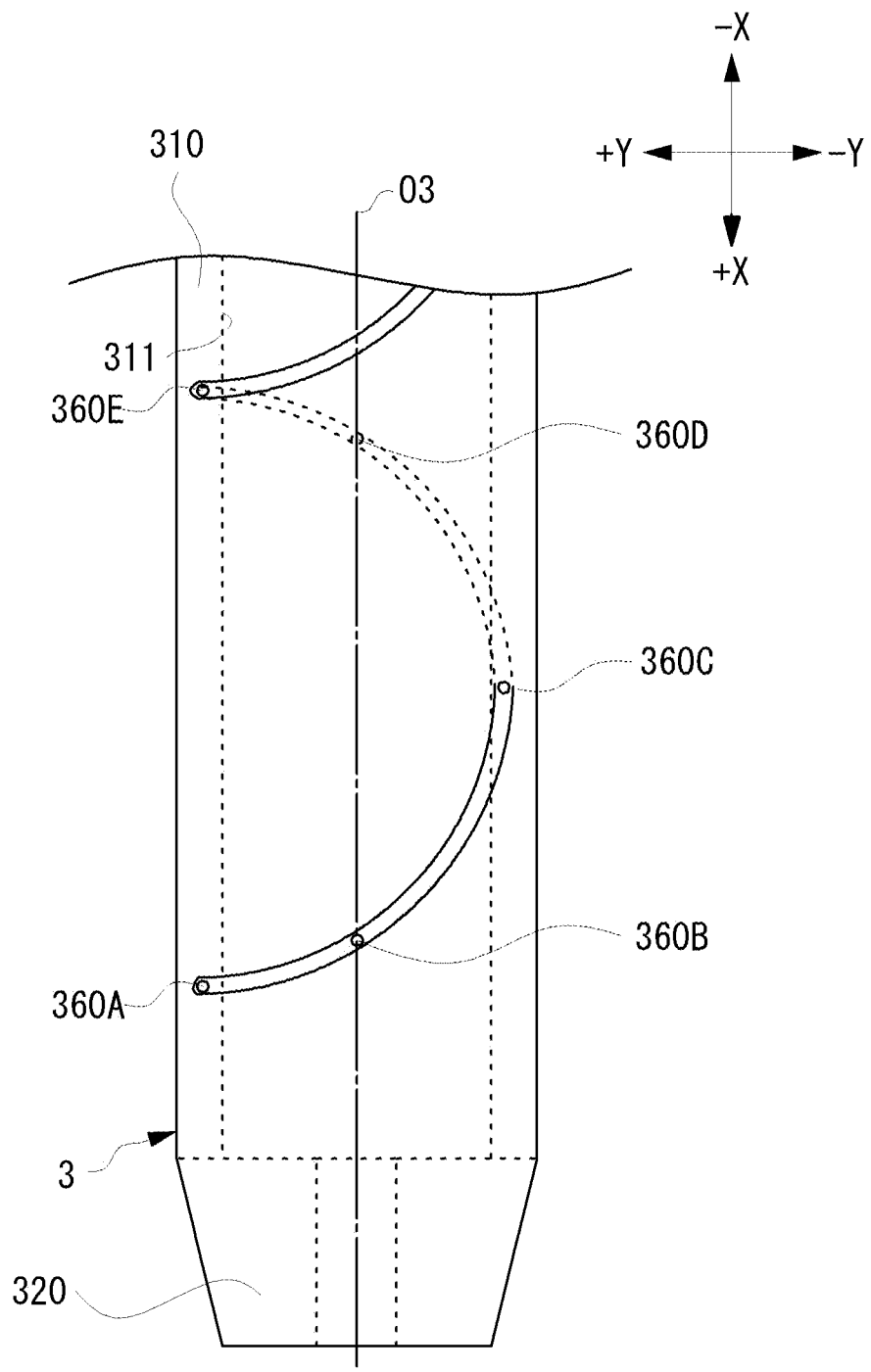
FIG. 11 is an enlarged view of a portion near the tip portion of a catheter 3 according to a fourth modification.

A catheter 3 according to the fourth modification as shown in FIG. 11 includes multiple temperature sensors 360 (360A, 360B, 360C, 360D, 360E). The measurement positions (the measurement points indicated by 360A, 360B, and 360C, 360D, 36E in this modification) of the plurality of temperature sensors 360 are respectively arranged in a plurality of portions of the tip portion of the catheter 3. Thus, useful information can be acquired based on temperature detection results at each of the plurality of measurement positions. For example, it is also possible to confirm the direction in which the laser light is emitted by confirming which of the plurality of measurement positions has a higher temperature than other measurement positions. Also, a health care worker can improve treatment accuracy by more accurately grasping the temperature at each measurement position.

In the catheter 3 of the fourth modification, the wire of the temperature sensor 360 is arranged spirally in the shaft 310 of the catheter 3. Thus, the rigidity of the catheter 3 having an elongated shape can be appropriately secured as compared to the wire that linearly extends along the axial direction. Thus, the accuracy of treatment can be further improved. As one example, in this modification, an elongated thermocouple with multiple measurement points is used as the temperature sensor 360. By arranging the wire of the elongated temperature sensor 360 in a spiral shape, the rigidity of the catheter 3 is secured.

In the catheter 3 of the fourth modification, the wire of the temperature sensor 360 includes a material having radiation opacity. Thus, the position of the catheter 3 can be easily recognized appropriately by radiographic imaging. Note, in the fourth modification, the wire of the temperature sensor 360 having radiation opacity extends in a spiral shape, making it easier to recognize the position of the catheter 3.

(First Evaluation Test)

Referring to FIG. 12, the results of the first evaluation test for evaluating a lower limit of light irradiation density of laser light emitted from the laser light source 230 at the time of the laser light exiting the light irradiation device 2 will be described. In the first evaluation test, the inventors connected an optical fiber to a laser light source and arranged a sensor that detects laser light at a position toward which laser light emitted from a tip of the optical fiber travels. Next, the inventors changed the state of laser light in the optical path between the tip of the optical fiber and the sensor to (1) a "blank state" where nothing is arranged, (2) a "carotid artery arrangement state" where a pig's carotid artery is arranged, and (3) an "aorta arrangement state" where a pig's aorta is arranged, and confirmed the detection results of the laser light by the sensor while changing the light irradiation density of the laser light in each state. In (2) the "carotid arrangement state" and (3) the "aorta arrangement state," the detection results by the sensor are the detection results of the laser light passing through the carotid artery or aorta and reaching the sensor.

Note that the core diameter of the fiber used in the first evaluation test was 400 μm (surface area is 0.001256 cm$^2$). The "output value of the blank state" shown in FIG. 12 was almost equal to the output value of laser light emitted from the tip end of the fiber. Thus, by dividing the "output value of the blank state" by the surface area of the fiber core, the light irradiation density of laser light emitted from the tip end of the fiber was calculated. The laser light source used in the first evaluation test was a "MLL-III-690" manufactured by CNI Optoelics Technology. The sensor used in the first evaluation test was an "S310C" manufactured by THORLABS. The lower limit value that the sensor used in the first evaluation test was able to detect was 10 mW. This sensor may have detected an output value of less than 10 mW, but detection results of less than 10 mW were unreliable. Accordingly, in the first evaluation test, when the detection result by the sensor indicated a value of 10 mW or more, laser light penetrating the blood vessel was determined to be appropriately detected (that is, "detected").

As shown in FIG. 12, when the light irradiation density of laser light was 584.4 W/cm$^2$, a sufficient output value of 10 mW or more was detected in both (2) the "carotid artery arrangement state" and (3) the "aorta arrangement state". Also, when the light irradiation density of laser light was 78.8 W/cm$^2$, a sufficient output of 21.1 mW was detected in (2) the "carotid artery arrangement state", but a sufficient output was not detected in (3) the "aorta arrangement state". When the light irradiation density of laser light was 41.4 W/cm$^2$ or less, a sufficient output was not detected in both (2) the "carotid arrangement state" and (3) the "aorta arrangement state".

From the above results, when the light irradiation density of laser light was about 80 W/cm$^2$, the laser light did not sufficiently penetrate a thick blood vessel such as an aorta, and therefore a therapeutic effect was less likely to be obtained. However, the laser light was likely to penetrate a thin blood vessel such as a carotid artery and to properly irradiate a tissue with the laser light by having the light irradiation density of the laser light of about 80 W/cm$^2$. From the above results, it is preferable that the lower limit of the light irradiation density of laser light emitted from the laser light source 230 at the time of the laser light exiting the light irradiation device 2 is 80 W/cm$^2$. It should be noted that the higher the output value of the laser light emitted to the tissue, the more treatment effects can be efficiently obtained. Therefore, it is more preferable that the lower limit of the light irradiation density at the time of the laser light exiting the light irradiation device 2 is 300 W/cm$^2$. Furthermore, as shown in FIG. 12, when the light irradiation density of laser light was 584.4 W/cm$^2$, it is found that the laser light was able to penetrate through even a thick aorta to reach a tissue that was appropriately irradiated. Therefore, it is more preferable that the lower limit of the light irradiation density at the time of the laser light exiting the light irradiation device 2 is 600 W/cm$^2$.

(Second Evaluation Test)

Next, the results of the second evaluation test for evaluating an upper limit of light irradiation density of laser light emitted from the laser light source 230 at the time of the laser light exiting the light irradiation device 2 will be described. In the second evaluation test, the inventors connected an optical fiber to a laser light source and arranged a sensor to detect laser light at a position toward which the laser light is emitted from a tip of the optical fiber. Next, the inventors changed the state of laser light in the optical path from the tip end of the optical fiber to the sensor between (1) a "blank state" where nothing was arranged in the optical path and (2) a "carotid artery arrangement state" in which a pig's carotid artery was arranged in the optical path, and caused the laser light to be emitted from the tip end of the optical fiber in each state. Then, the inventors evaluated the upper limit of the laser light at the time of the laser light exiting the light irradiation device 2 based on the light irradiation density with which the carotid artery was burned out in (2) the "carotid artery arrangement state".

Note that the core diameter of the fiber used in the first evaluation test was 400 μm (surface area was 0.001256 cm$^2$) and NA was 0.39. Similar to the first evaluation test, the output value of the laser light detected by the sensor in the "blank state" was almost equal to the output value of the laser light emitted from the tip end of the fiber. Thus, by dividing the output value detected in "the blank state" by the surface area of the fiber core, the light irradiation density of laser light emitted from the tip end of the fiber was calculated. The laser light source used in the second evaluation test was a "BRIX690-2500 UHP" manufactured by Omicron. The sensor used in the second evaluation test was an "S425C" manufactured by THORLABS.

First, the inventors set the output value of the laser light source to the maximum set output value of 2500 mW, and found that the detected output value fluctuated between 1800 mW and 2100 mW by checking the output values of the laser light detected by the sensor in (1) the "blank state". Next, the inventors confirmed the output values of the laser light detected by the sensor in (2) the "carotid artery arrangement state" by setting the output value of the laser light source to the maximum set output of 2500 mW as described above. As a result, the output values of the laser light that penetrated through the carotid artery and was detected by the sensor fluctuated between 300 mW and 350 mW. Accordingly, in (2) the "carotid artery arrangement state", the output value of laser light that was emitted from the tip end of the fiber and presented the detection result of 300 mW by the sensor was estimated to be about 1800 mW. Also, when 350 mW was detected by the sensor, the output value of the laser light emitted from the tip end of the fiber was estimated to be about 2100 mW. If the detection results by the sensor indicated the detected values were less than 350 mW, the carotid artery was not burned out even though the laser light was continuously emitted in (2) the "carotid artery arrangement state". However, when the detection results by the sensor indicated the detected values reached 350 mW, the blood vessel wall of the carotid artery was burned out. The light irradiation density of the laser light emitted from the tip end of the fiber was approximately 1,670 W/cm² when the sensor detected the value of 350 mW in (2) the "carotid artery arrangement state".

From the above results, if the light irradiation density of laser light was set to 1,670 W/cm², there was a possibility that the blood vessel wall may have been damaged. Therefore, it would be difficult to guarantee safety during treatment if the light irradiation density has 1,670 W/cm². However, if the light irradiation density of laser light is set to 1,600 W/cm² or less, the possibility that the blood vessel wall is damaged decreases. From the above results, it is preferable that the upper limit of the light irradiation density of laser light emitted from the laser light source 230 at the time of the laser light exiting the light irradiation device 2 is 1,600 W/cm². In order to further enhance safety during treatment (that is, further reduce the possibility that the blood vessel wall may be damaged), it is desirable that the upper limit of the light irradiation density at the time of the laser light exiting the light irradiation device 2 is 1,300 W/cm².

It is also possible to adopt only some of the configurations exemplified in the embodiment and the modifications described above in a light irradiation system, light irradiation device, or catheter. Also, it is possible to combine multiple configurations shown in the embodiment and the modifications. As described above, it is also possible to independently use only the light irradiation device 2 without using the catheter 3. Also, a fluid flow path that penetrates the shaft 210 from the base side to the tip side may be formed in the shaft 210 of the light irradiation device 2. In this case, various problems due to a temperature increase (for example, a failure due to the heat from the laser light source 230) are appropriately suppressed by having a cooling fluid flow through the flow path of the shaft 210.

The invention claimed is:

1. A light irradiation device for medical use having an elongated shape, the light irradiation device comprising:
    a laser light source that is disposed in a tip portion of the light irradiation device, the laser light source being configured to emit laser light in a predetermined wavelength range, wherein
    after the light irradiation device was inserted into a blood vessel in a living body, the laser light source is configured to emit the laser light in a direction intersecting a longitudinal axial direction of the light irradiation device to irradiate a living tissue outside of the blood vessel with the laser light passing through a blood vessel wall, and
    the laser light source is further configured to emit the laser light having a light irradiation density in a range between 80 W/cm² and 1,600 W/cm², inclusive, at a time of the laser light exiting the light irradiation device.

2. The light irradiation device according to claim 1, wherein
    the laser light source includes a plurality of laser light sources, and
    the plurality of laser light sources are disposed in the tip portion.

3. The light irradiation device according to claim 2, wherein at least one of the plurality of laser light sources is separately controllable from other laser light sources of the plurality of laser light sources.

4. The light irradiation device according to claim 2, wherein the plurality of laser light sources are configured to emit the laser light in a same wavelength range.

5. The light irradiation device according to claim 2, wherein at least one of the plurality of laser light sources is configured to emit the laser light in a different wavelength range from other laser light sources of the plurality of laser light sources.

6. The light irradiation device according to claim 1, wherein
    the laser light source is housed in a portion of a device body having an elongated shape, and
    at least the portion of the device body is made of a material that transmits the laser light emitted from the laser light source.

7. The light irradiation device according to claim 1, wherein the tip portion of the light irradiation device in which the laser light source is disposed includes a marker having radiation opacity.

8. The light irradiation device according to claim 7, wherein at least a portion of the laser light source is made of a material having radiation opacity such that the laser light source serves as the marker.

9. The light irradiation device according to claim 1, wherein the laser light source is a surface-emitting laser that has a substrate and is configured to emit laser light in a direction perpendicular to the substrate.

10. The light irradiation device according to claim 1, wherein the laser light source is a semiconductor laser that is a circuit element manufactured using a semiconductor as a material.

11. The light irradiation device according to claim 1, further comprising
    a light detection transmission member that is positioned in a device body of the light irradiation device and having a first end portion at the tip portion and a second end portion opposite the first end portion, the second end portion coupled to an optical sensor, and the light detection transmission member is configured to transmit light having entered the tip portion to an optical sensor, or
    an optical sensor that is disposed in the tip portion.

12. The light irradiation device according to claim 1, further comprising a plurality of temperature sensors disposed in the tip portion.

13. The light irradiation device according to claim 1, further comprising
    a wire that extends from a base side of the light irradiation device to the tip portion, wherein
    the wire extends in a spiral shape.

14. The light irradiation device according to claim 1, further comprising a position detection member that is configured to detect a position of the tip portion in a lumen of the living body.

15. The light irradiation device according to claim 1, further comprising a magnetic member that is configured to guide a position or an orientation of the tip portion in the living body using a magnetic force generated by the magnetic member placed in a magnetic field.

16. A light irradiation system for medical use, the light irradiation system comprising:
    a catheter that is formed in an elongated tube shape; and
    the light irradiation device of claim 1 inserted into a lumen of the catheter, wherein
    a light transmission portion is formed in at least a portion of a side surface of a tip end of the catheter, and
    the light transmission portion is configured to transmit the laser light emitted from the laser light source to exit the catheter.

17. The light irradiation system according to claim 16, wherein a portion of the tip end of the catheter to which the laser light source is located close is made of a material having a thermal conductivity of 0.1 W/m*K or more.

18. The light irradiation system according to claim 16, wherein a cooling fluid flows into the lumen of the catheter after the light irradiation device was inserted into the catheter.

19. The light irradiation system according to claim 16, wherein
the catheter further includes a plurality of temperature sensors, and
each of a plurality of temperature measurement positions of the plurality of temperature sensors is located in a respective one of a plurality of portions of the catheter.

20. The light irradiation system according to claim 16, wherein
the catheter further includes a wire that extends from a base side of the catheter to the tip end, and
the wire extends in a spiral shape.

* * * * *